United States Patent [19]
Nakauchi et al.

[11] Patent Number: 6,085,139
[45] Date of Patent: Jul. 4, 2000

[54] CONTROL SYSTEM FOR AUTOMATIC VEHICLE TRANSMISSION

[75] Inventors: Norio Nakauchi; Tatsuyuki Ohashi, both of Wako, Japan

[73] Assignee: Honda Giken Kogyo Kabushiki Kaisha, Tokyo, Japan

[21] Appl. No.: 08/964,351

[22] Filed: Nov. 4, 1997

[30] Foreign Application Priority Data

Nov. 5, 1996 [JP] Japan .................................. 8-308699

[51] Int. Cl.$^7$ .................................................. F16H 59/04
[52] U.S. Cl. ............................... 701/52; 701/55; 701/65; 477/97
[58] Field of Search .................... 701/51, 52, 55, 701/56, 62, 65; 477/97, 120

[56] References Cited

U.S. PATENT DOCUMENTS

| | | | |
|---|---|---|---|
| 4,973,749 | 11/1990 | Dunkley et al. | 701/51 |
| 5,484,350 | 1/1996 | Ishikawa et al. | 477/97 |

FOREIGN PATENT DOCUMENTS

| | | |
|---|---|---|
| 59-37359 | 2/1984 | Japan . |
| 2-8545 | 1/1990 | Japan . |
| 6-74318 | 3/1994 | Japan . |

*Primary Examiner*—Tan Nguyen
*Attorney, Agent, or Firm*—Armstrong, Westerman. Hattori, McLeland & Naughton

[57] ABSTRACT

A control system for an automatic vehicle transmission which has auto-shifting means or auto-shift mode for determining a gear to be shifted to in accordance with predetermined gearshift scheduling characteristics in response to the detected vehicle speed and the engine load, and manual-shifting means or manual-shift mode for determining a gear to be shifted to in response to a manual-shift command generated by the vehicle driver. The system further includes auto-downshifting means or sub-auto-shift mode for determining a gear to be downshifted to if the detected vehicle speed is less than a threshold value when the manual-shifting means is in operation. In the system it is estimated whether the vehicle is hill climbing or hill descending, and the threshold value is increasing when the vehicle is hill climbing or descending. With the arrangement, it becomes possible to downshift before the drivability or driver's comfort is degraded during the hill climbing or descending.

22 Claims, 16 Drawing Sheets

FIG. 7
MAPS  0 : STEEP HILL CLIMBING (SHC)
1 : MODERATE HILL CLIMBING (MHC)
2 : LEVEL ROAD RUNNING (LRR)
3 : MODERATE HILL DESCENT (MHD)
4 : STEEP HILL DESCENT (SHD)
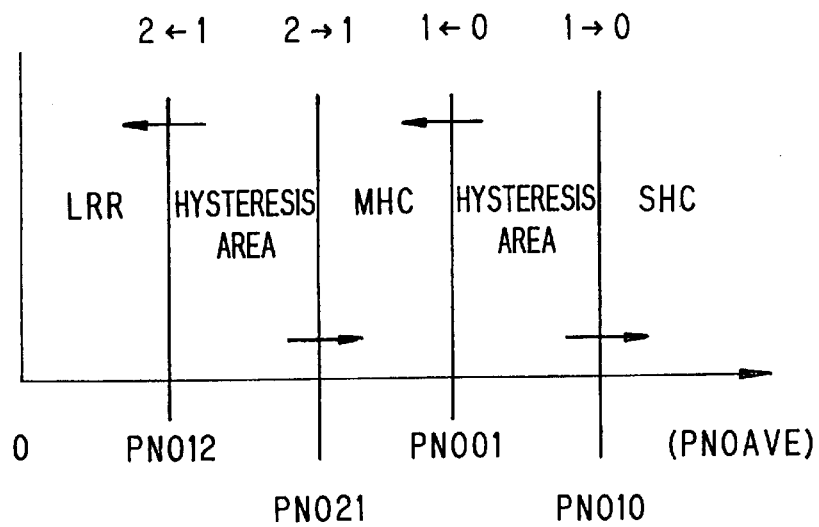
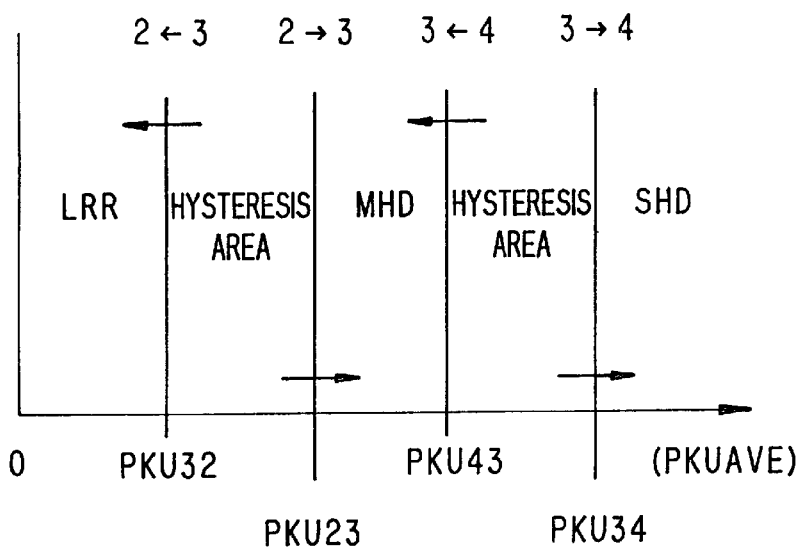

FIG.8

| | | 0←1 | 1←0 | | | | | |
|---|---|---|---|---|---|---|---|---|
| | | PN001 | PN010 | PN012 PN021 | PKU23 | PKU32 PKU34 | PKU43 | |
| POSSIBLE LARGEST MAPS | MAPS2 | 0 | 1 | 2 | 2 | 3 | 4 | 4 |
| POSSIBLE SMALLEST MAPS | MAPS1 | 0 | 0 | 1 | 2 | 3 | 3 | 4 |
| | | SHC | MHC | LRR | | MHD | | SHD |

CONTROL SYSTEM FOR AUTOMATIC VEHICLE TRANSMISSION

BACKGROUND OF THE INVENTION

1. Field of the Invention

This invention relates to a system for controlling an automatic vehicle transmission, more particularly to a system for, and a method of, controlling an automatic vehicle transmission.

2. Description of the Related Art

Prior-art automatic vehicle transmissions are provided with multiple ranges (positions), typically P, R, N, D4, D3, 2 and 1. In the automatic gearshift range D4, gearshift is conducted automatically in accordance with a gearshift scheduling map (characteristics) stored in an on-board microcomputer memory, based on the vehicle speed and the throttle opening (indicative of the engine load) as parameters indicating the vehicle operating conditions. The vehicle driver ordinarily drives with the shift lever setting in the D4 range. This prior-art automatic gearshift mode is hereinafter referred to as "auto-shift mode" or "auto-shifting means" in the specification.

Since in the D4 range in the auto-shift mode, gearshift is conducted independently of any desire on the part of the driver, if the driver desires to downshift for sporty driving or for utilizing the engine braking effect, he must manually move the shift lever from the D4 range to the D3 or 2 range. On the other hand, when he again desires to upshift from the gear, he must return the shift lever to the D4 range. This means that the driver is required to frequently move the shift lever when running on a winding or hilly road. Although in the D3, for example, it is possible to run at 1st, 2nd or 3rd gear, hence it is sometimes difficult for the driver, contrary to what has been expected, to obtain the desired gear.

Therefore, as taught by Japanese Laid-Open Patent application Nos. Sho 59(1984)-37359, Hei 2(1990)-8545 and Hei 6(1994)-74318, it has been proposed to provide, in the automatic vehicle transmission, a switch or lever separate of the shift lever which enables the driver to upshift or downshift by manual operation of the switch or lever. The use of such a device will hereinafter be referred to as "manual-shift mode" or "manual-shifting means" in the specification.

When the driver keeps a certain gear in the manual-shift mode, the acceleration might sometimes be poor due to the engine speed drop, or engine braking effect might become insufficient at times if the gear is higher relative to the vehicle speed, degrading drivability or driver's comfort. In order to solve these problems, therefore, it has been proposed to provide an automatic downshifting function in the manual-shift mode. The automatic downshifting function operates to downshift when the vehicle traveling speed has drooped below a reference or threshold speed. The reference speed is predetermined differently for the respective gears. The operation of the automatic downshifting function will hereinafter referred to as "sub-auto-shift mode" or "auto-downshifting means".

However, when the vehicle is climbing a hilly road with the manual shift mode and the sub-auto-shift mode in operation, the drivability or driver's comfort becomes worse due to the running resistance increase until the vehicle speed has dropped below the reference speed. Similarly when the vehicle climbs a hilly road, the driver may sometimes feel vehicles acceleration speed great. The downshifting is not effected, however, until the vehicle speed has dropped below the reference speed, also degrading the drivability or driver's comfort.

BRIEF SUMMARY OF THE INVENTION

An object of this invention is therefore to overcome the aforesaid drawbacks and to provide a system for and method of controlling an automatic vehicle transmission whose operation includes the auto-shift mode and the manual-shift mode with the sub-auto-shift mode, which enables to effect gearshift appropriately in response to the running condition of the vehicle.

A second object of this invention is therefore to provide a system for and method of controlling an automatic vehicle transmission whose operation includes the auto-shift mode and the manual-shift mode with the sub-auto-shift mode, which enables to effect gearshift appropriately when the vehicle runs on a hilly road.

In order to achieve the objects, there is provided a system for controlling automatic transmission of a vehicle having an engine mounted on the vehicle and a plurality of gears including vehicle speed detecting means for detecting a vehicle speed at which the vehicle is travelling, engine load detecting means for detecting a load of the engine, auto-shifting means for determining one of the gears to be shifted to in accordance with predetermined gearshift scheduling characteristics in response to the detected vehicle speed and the engine load, manual-shifting command generating means for generating a manual-shifting command in response to operation of a device manually operated by a vehicle driver, manual-shifting means for determining one of the gears to be shifted to in response to the manual-shift command, discriminating means for discriminating which of the auto-shifting means and the manual-shifting means is in operation, auto-downshifting means for determining one of the gears to be downshifted to if the detected vehicle speed is less than a threshold value when the manual-shifting means is in operation and gearshift means for conducting gearshift such that the one of the gears is shifted to. In the system, there are provided with hill-climbing estimating means for estimating whether the vehicle is climbing a hill and threshold value increasing means for increasing the threshold value when the hill climbing means estimates that the vehicle is hill climbing.

BRIEF DESCRIPTION OF THE DRAWINGS

This and other objects and advantages of the invention will be more apparent from the following description and drawings, in which:

FIG. 7 and FIG. 8 are explanatory views for showing reference values to be compared with the reference or index to select any of the maps;

FIG. 11 is a flow chart showing the subroutine described in the flow chart of FIG. 10 for increasing a desired gear to be shifted to;

FIG. 12 is a flow chart showing the subroutine described in the flow chart of FIG. 10 for decreasing a desired gear to be shifted to;

DETAILED DESERTION OF THE PREFERRED EMBODIMENTS

An embodiment of the invention will now be explained with reference to the attached drawings.

Figure 1:
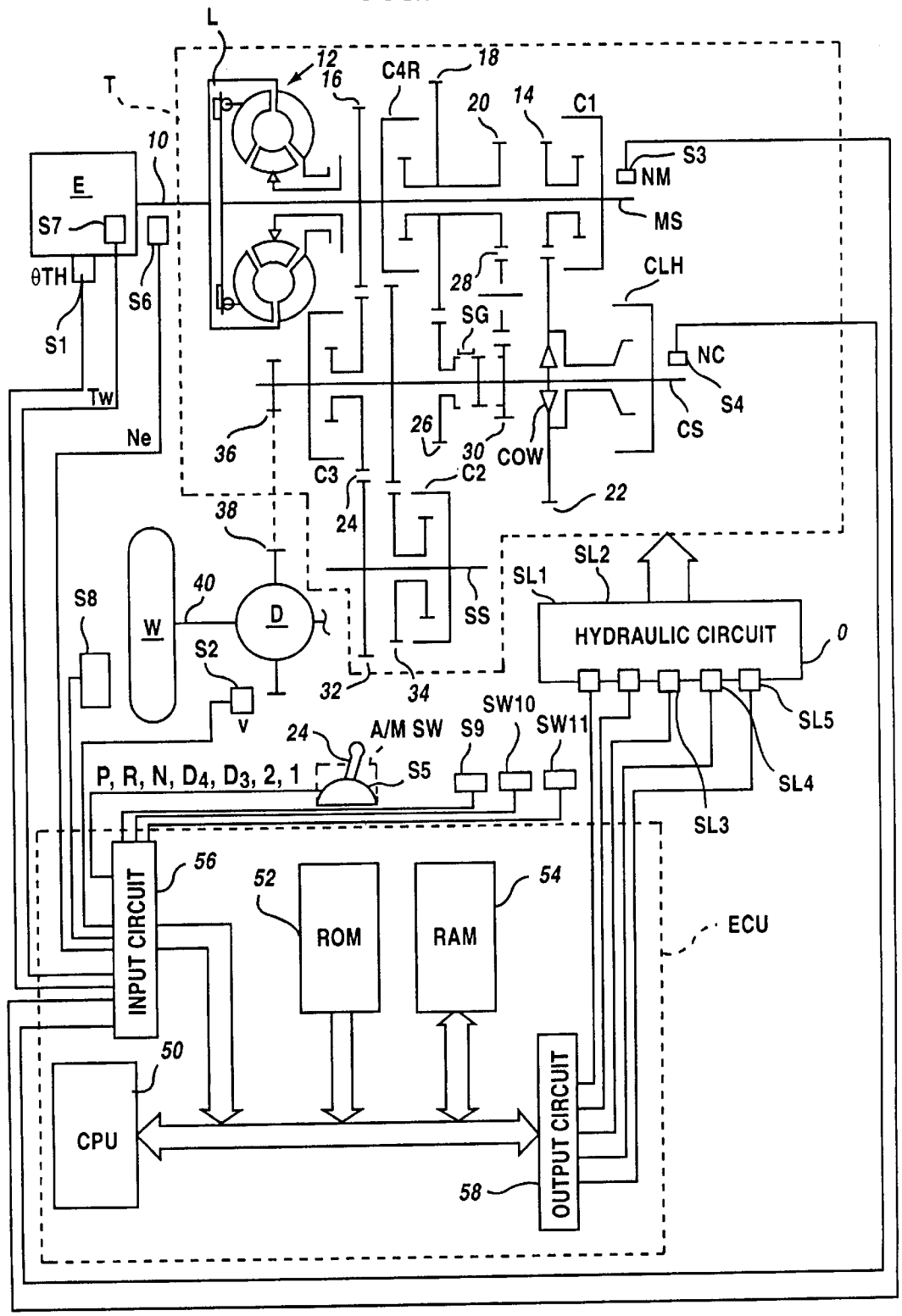
FIG. 1 is an overall schematic view of a control system for an automatic vehicle transmission according to the invention.

FIG. 1 is an overall schematic view of a control system for an automatic vehicle transmission according to the invention.

As shown in FIG. 1, an automatic vehicle transmission T is equipped with a main shaft (transmission input shaft) MS connected to a crankshaft 10 of an internal combustion engine E through a torque converter 12 having a lockup mechanism L. The automatic transmission is configured to be a parallel-shaft type and has a countershaft CS and a secondary shaft SS provided in parallel with the main shaft MS and the countershaft CS. These shafts carry gears.

More specifically, the main shaft MS carries a main first gear 14, a main third gear 16, a main fourth gear 18 and a main reverse gear 20. The countershaft CS carries a counter first gear 22 which meshes with the main first gear 14, a counter third gear 24 which meshes with the main third gear 16, a counter fourth gear 26 which meshes with the main fourth gear 18 and a counter reverse gear 30 which meshes with the main reverse gear 20 through a reverse idle gear 28. The secondary shaft SS carries a first secondary second gear 32 and a second secondary second gear 34.

1st gear (first-speed stage) is established or effected when the main first gear 14 rotatably mounted on the main shaft MS is engaged with the main shaft MS by a first-gear hydraulic clutch C1. Since the first-gear hydraulic clutch C1 is kept in the engaged state during establishment of the 2nd to 4th gears, the counter first gear 22 is fixed by a one-way clutch COW. A first-gear-hold clutch CLH is provided such that the engine E is driven from driven wheels W, in other words the engine braking is effected when the 1 or 2 range is selected.

2nd gear (second-speed stage) is established via the main third gear 16, the counter third gear 24 and the first secondary second gear 32, when the second secondary second gear 34 rotatably mounted on the secondary shaft SS is engaged with the secondary shaft SS by a second-gear hydraulic clutch C2. 3rd gear (third-speed stage) is established when the counter third gear 24 rotatably mounted on the countershaft CS is engaged with the countershaft CS by a third-gear hydraulic clutch C3.

4th gear (fourth-speed stage) is established when the counter fourth gear 26 rotatably mounted on the countershaft CS is engaged with the countershaft CS by a selector gear SG and with this state maintained the main fourth gear 18 rotatably mounted on the main shaft MS is engaged with the main shaft MS by a fourth-gear/reverse hydraulic clutch C4R.

The reverse gear is established when the counter reverse gear 30 rotatably mounted on the countershaft CS is engaged with the countershaft CS by the selector gear SG and with this state maintained the main reverse gear 20 rotatably mounted on the main shaft MS is connected with the main shaft MS by the fourth-gear/reverse hydraulic clutch C4R.

The rotation of the countershaft CS is transmitted through a final drive gear 36 and a final driven gear 38 (which meshes with the gear 34) to a differential D, from where it is transmitted to the drive wheels W, W through left and right drive shafts 40, 40.

A throttle position sensor (engine load detecting means) S1 is provided in the air intake pipe (not shown) of the engine E at a point in the vicinity of a throttle valve (not shown) and generates a signal indicative of the degree of throttle valve opening θ TH. A vehicle speed sensor (vehicle speed detecting means) S2 is provided in the vicinity of the final driven gear 38 and generates a signal indicative of the vehicle traveling speed V from the rotational speed of the final driven gear 38.

An input shaft rotational speed sensor S3 is provided in the vicinity of the main shaft MS and generates a signal indicative of the rotational speed NM of the transmission input shaft from the rotation of the main shaft MS. An output shaft rotational speed sensor S4 is provided in the vicinity of the countershaft CS and generates a signal indicative of the rotational speed NC of the transmission output shaft from the rotation of the countershaft CS.

A shift lever position sensor S5 is provided in the vicinity of a shift lever 24 installed on the vehicle floor near the driver's seat and generates a signal indicating which of the seven positions P, R, N, D4, D3, 2 and 1 is selected by the driver. A crankshaft sensor S6 is provided in the vicinity of the crankshaft 10 of the engine E and generates a signal indicative of the engine speed Ne from the rotation of the crankshaft 10.

A coolant temperature sensor S7 is provided at an appropriate location in the cylinder block and generates a signal indicative of the engine coolant temperature Tw. A brake switch S8 is provided in the vicinity of a brake pedal (not shown) and generates a signal indicating whether the brake is in operation.

The outputs of the sensors S1, etc., are sent to an ECU (electronic control unit).

The ECU is constituted as a microcomputer comprising a CPU (central processing unit) 50, a ROM (read-only memory) 52, a RAM (random access memory) 54, an input circuit 56 and an output circuit 58. The outputs of the sensors S1, etc., are input to the microcomputer from the input circuit 56.

The CPU 50 of the microcomputer controls the gearshift and the operation of the lockup clutch L of the torque converter 12, determines and supplies a command value to a hydraulic circuit O through the output circuit 58.

The hydraulic circuit O includes magnetic solenoid valves SL1, SL2 for effecting gearshift, a magnetic solenoid valve SL3 for turning on/off the lockup clutch and a magnetic solenoid valve SL4 for regulating clutch engagement, and a magnetic solenoid valve SL5 for regulating the pressure applied to the hydraulic clutches.

More specifically, the CPU 50 determines the gear (gear ratio) to be shifted to and energizes/deenergizes the solenoid valves SL1, SL2 of the hydraulic circuit O via the output circuit 58 so as to switch shift valves (not shown) and thereby shifting gears. It also controls the operation of the lockup clutch L of the torque converter 12.

Figure 2:
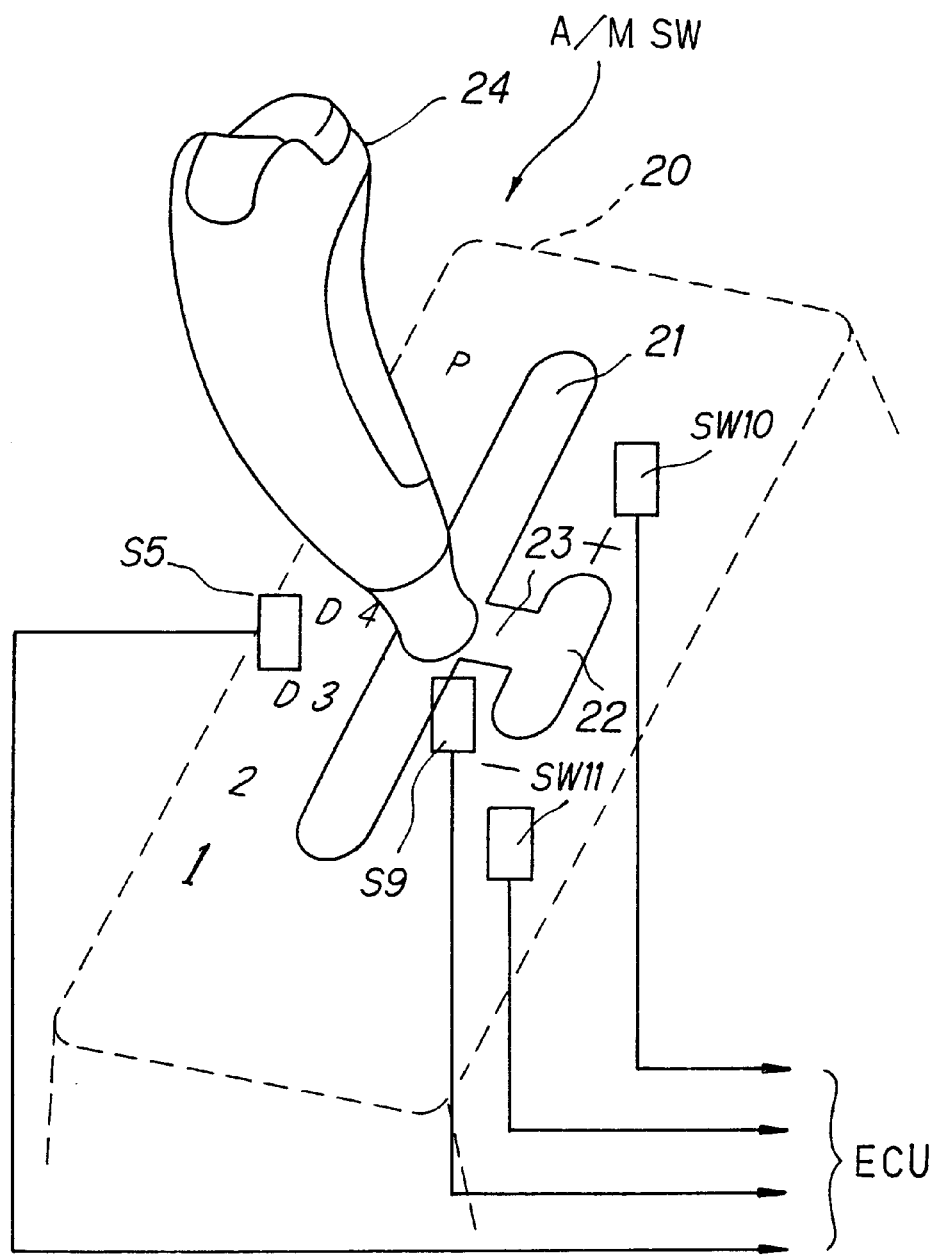
FIG. 2 is a perspective view showing a switching mechanism A/M SW for switching the gearshift control between the auto-shift mode and the manual-shift mode.

In the vicinity of the shift lever 24, there is provided a switching mechanism A/M SW for switching the gearshift control between the aforesaid auto-shift mode and the manual-shift mode. To be more specific, the shift lever 24 is installed in a console box 20, as partly shown in FIG. 2 at the position near the driver's seat. The console box 20 has a generally H-shaped slot made up of a main select gate 21, a sub-select gate 22 and a passage 23 connecting them in such a manner that the shift lever 24 is movable between the gates.

The main select gate 21 is provided for effecting the conventional gearshift, i.e., the auto-shift mode. The driver can select any of ranges (positions) P, R, N, D4, D3, 2 and 1 by moving the shift lever 24 to a position corresponding thereto. The position of the shift lever 24 is detected by the aforesaid shift lever position sensor S5. When the D4 or D3 range is selected, the gearshift is conducted automatically in the forward four gears in the conventional manner according to the predetermined gearshift scheduling maps (characteristics) in response to the vehicle speed and the throttle opening.

The sub-select gate 22 is provided for effecting the manual-shift mode which allows the driver to intentionally upshift or downshift. More specifically, the driver can change the position of the shift lever 24 from the gate 21 to the gate 22 through the path 23 and move it in the direction of the plus sign or the minus sign in the figure.

A first switch S9 is installed in the vicinity of the passage 23 and generates a signal indicating which gate the shift lever is, i.e., which of the auto-shift mode and the manual-shift mode is selected. A second switch SW10 is provided at a location in the vicinity of the plus sign and generates an ON signal indicative of a upshifting command when the shift lever 24 is moved in the direction of plus sign. A third switch SW11 is provided at location in the vicinity of the minus signal and generates an ON signal indicative of a downshifting command when the shift lever 24 is moved in the direction of minus signal.

The A/M SW mechanism is configured such that if the driver releases the shift lever 24 when it is in the sub-select gate 22, the shift lever 24 is restored or returned to a neutral position near the middle of the gate 22 by a spring (not shown). The switches SW10, SW11 are non-locked type switches and generates no ON signal when they are in the neutral position. The outputs of the switches S9, SW10 and SW11 are sent to the ECU.

The operation of the system will be explained.

Figure 3:
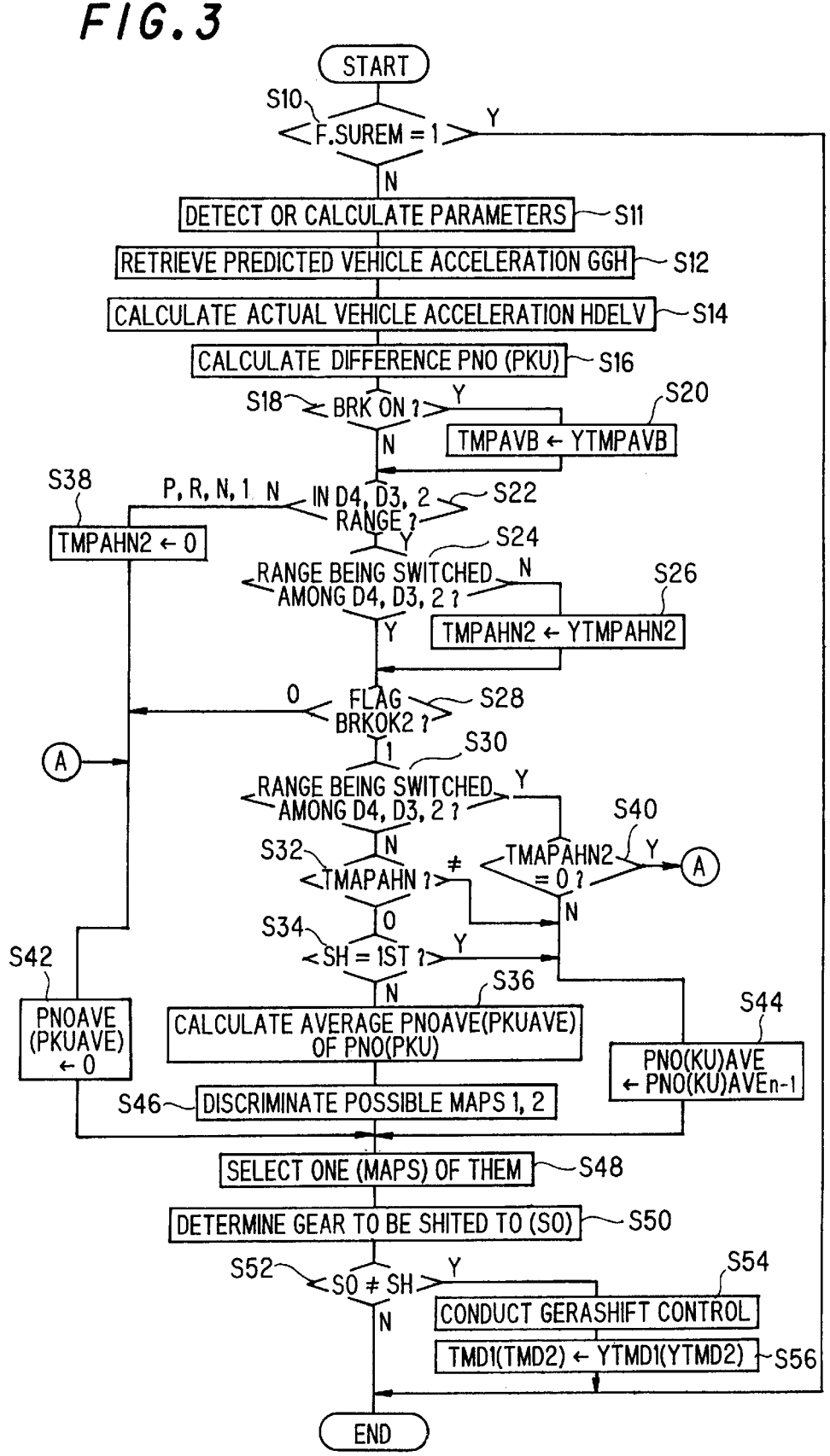
FIG. 3 is a flow chart showing the operation of the system illustrated in FIG. 1.

First, the gearshift control in the auto-shift mode will be explained with reference to a flow chart shown in FIG. 3. The operation according to the procedures in the flow chart is the auto-shift mode or the automatic gearshift means. The program shown there is executed once every 20 msec.

Figure 4:
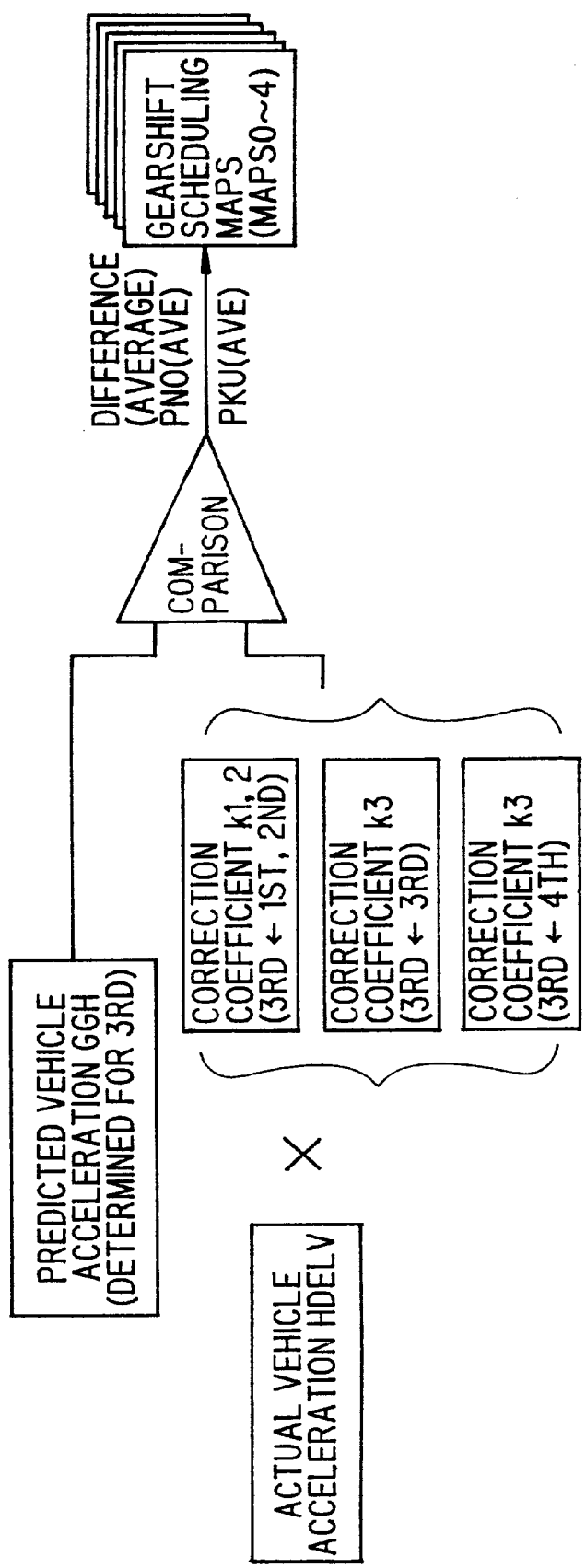
FIG. 4 is an explanatory view showing a predicted vehicle acceleration defined with respect to 3rd gear and actual vehicle acceleration to be compared therewith to determine a difference or index indicative of a running resistance which is then used for selecting five kinds of gearshift scheduling maps prepared beforehand.

The gearshift control illustrated in the figure is based on the technique described in U.S. Pat. No. 5,484,350 proposed by the assignee. In the technique, as illustrated in FIG. 4, a predicted vehicle acceleration (named GGH) which the vehicle would have during running on a level road at 3rd gear is prepared in advance as mapped data to be retrieved by at least the vehicle speed and the throttle opening (engine load).

Actual vehicle acceleration (named HDELV) which the vehicle actually generates is calculated based on the same parameters. Then a correction coefficient is retrieved from mapped data determined beforehand using the same parameters. The calculated actual vehicle acceleration is then multiplied by the correction coefficient and is corrected to a value estimated to be the actual vehicle acceleration when the vehicle runs at the 3rd gear.

Then a difference (named PNO or PKU) between the actual vehicle acceleration HDELV and the predicted vehicle acceleration GGH is calculated as PNO=GGH−HDELV and PKU=HDELV−GGH. When PNO is a large positive value, it means that the vehicle is climbing a hill. On the other hand, when PKU is a large positive value, it means that the vehicle is descending a hill. If PNO or PKU is a small positive value, it means that the vehicle runs on a level road. Thus, the difference PNO or PKU is an index indicative of the running resistance acting on the vehicle.

Five kind of gearshift scheduling maps (characteristics) for hill climbing, hill descent or level-road running are predetermined and one among the five maps is selected in response to the difference (index) PNO or PKU. Gearshift is controlled in accordance with the gearshift scheduling characteristics defined in the selected map in response to the detected vehicle speed and the throttle opening.

In the flow chart, the program begins in S10 in which it is determined whether the bit of a flag F.SUREM is 1, in other words, it is determined whether the manual-shift mode is selected, since the bit of the flag is set to 1 in a routine (not shown) when it is detected that the shift lever 24 is in the sub-select gate 22 from the signal output by the switch S9. When the result in S10 is affirmative, the program is immediately terminated, since this means that gearshift is controlled in the manual-shift mode.

When the result in S10 is negative, the program proceeds to S11 in which parameters used in the control including the vehicle speed V, the throttle opening θ TH are detected or calculated. The program then proceeds to S12 in which the predicted vehicle acceleration GGH is calculated. In S12, as mentioned above, the predicted vehicle acceleration GGH is retrieved from the mapped data by the vehicle speed and the throttle opening.

The program proceeds to S14 in which the actual vehicle acceleration HDELV is calculated in the manner described above.

The program proceeds to S16 in which the difference (index) PNO or PKU between the predicted vehicle acceleration and the actual vehicle acceleration is calculated, to S18 in which it is determined whether the signal output from the brake switch S8 is ON. When the result in S18 is affirmative, the program proceeds to S20 in which a brake timer (down counter) TMPAVB is set with a predetermined value YIMPAVB and is started to count down. Thus, the timer measures lapse of time since the brake pedal is released. This is because the braking force will not become zero immediately after the pedal was released. The corresponding value of YTMPAVE is set on the counter and braking is assumed to be continued until a period corresponding to when the value has expired.

When the result in S18 is negative or when the program proceeded past S20, the program then proceeds to S22 in which it is determined whether the range selected by the driver is D4, D3 or 2 in which the gearshift control for hill climbing or descending is needed. When the result of S22 is affirmative, the program proceeds to S24 in which it is determined whether the range switching among the three ranges is in progress. When the result is negative, the program proceeds to S26 in which another timer (down counter) TMPAHN2 is set with a predetermined value YTMPAHN2 and starts to measure time lapse to check whether the range switching is functioning properly.

When the result is affirmative in S24 or when the program goes past S26, the program then proceeds to S28 in which it is determined from the bit of a flag BRKOK2 whether the brake switch signal is normnal. When the bit is 1 and the brake switch signal is determined to be normal, the program proceeds to S30 in which it is again confirmed whether the switching among the three ranges is in progress. When the result in S30 is negative, the program proceeds to S32 in which a value in a third timer TMPAHN (down counter) is checked.

The timer is used for determining whether gearshift is in progress. When it is determined in S32 that the timer value has reached zero, since this means that no gearshift is in progress, the program proceeds to S34 in which it is checked whether the gear currently engaged (named SH) is 1st. This checking is made for simplifying calculation, since no downshifting is possible in 1st gear. When the result in S34 is negative, the program proceeds to S36 in which an average value (named PNOAVE or PKUAVE) of the difference (index) PNO or PKU is determined by calculating a weighted average value between the current and past differences.

On the other hand, when the result in S22 is negative, the program proceeds to S38 in which the timer TMPAHN2 is reset to zero, and to S42 in which the average value of the difference is made zero. The same procedures will be taken when S28 finds that the brake switch signal is not normal. When S30 finds that the range selection is in progress, the program proceeds to S40 in which it is determined whether the timer value TMPAHN2 has reached zero. Since this means that the range switching continues for a long period, it can be considered that a failure such as a wire breaking has occurred in the shift lever position sensor S5. As a result, the program proceeds to S42 in which the average value of the difference is made zero.

Figure 9:
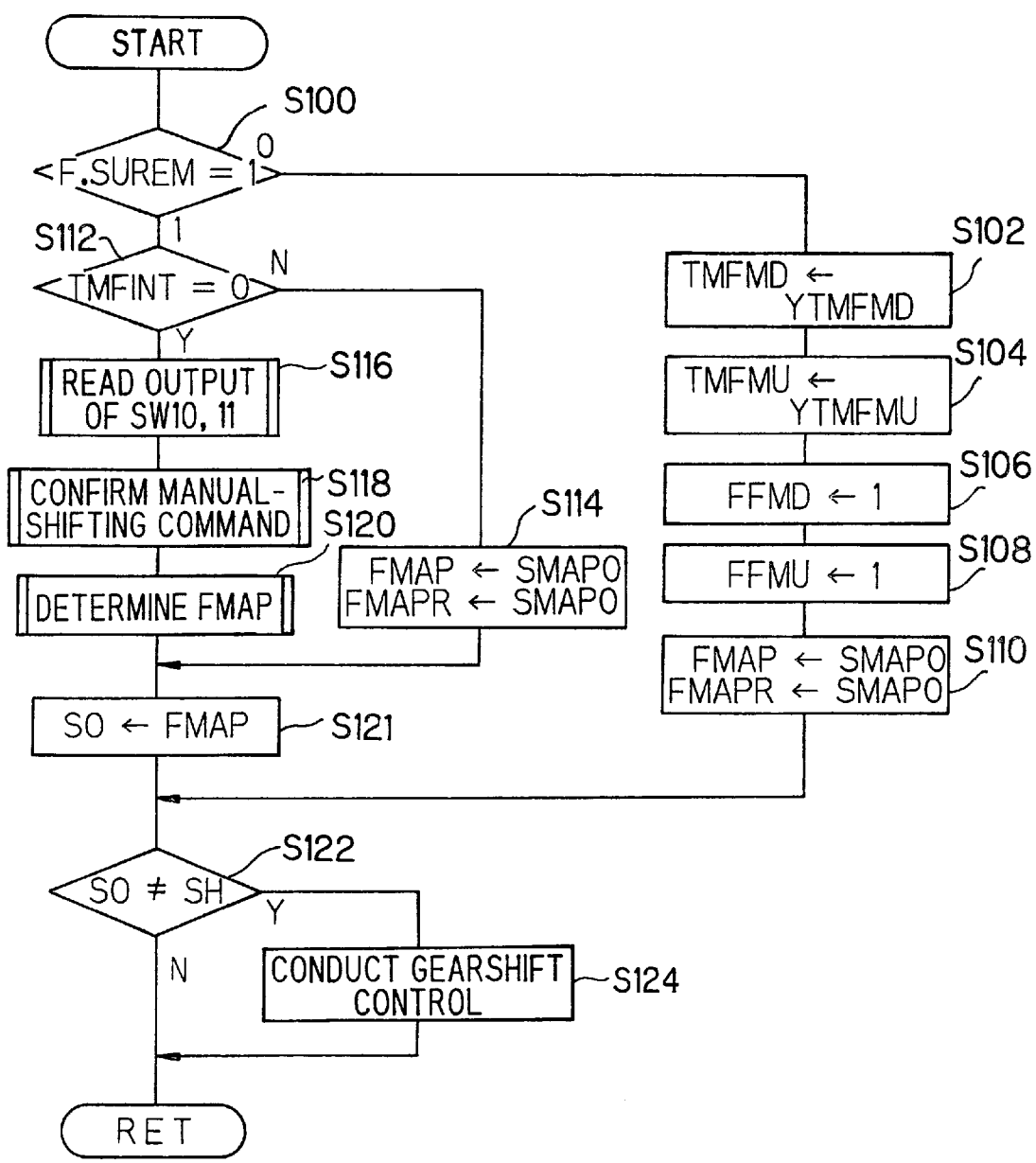
FIG. 9 is a flow chart showing the operation of the manual-shift mode of the control system illustrated in FIG. 1.

When S32 determines that gearshift is in progress, since it is not possible to determine a gear to be shifted to and it is difficult to accurately determine the actual vehicle acceleration, the program proceeds to S44 in which the average value of the difference is held to the value at the preceding cycle (n−1). Here, "n" means a sampling number in the discrete system, i.e., a cycle or time at which the program shown in FIG. 3 or FIG. 9 is executed and "n−1" means one cycle earlier than the current cycle.

Figure 5:
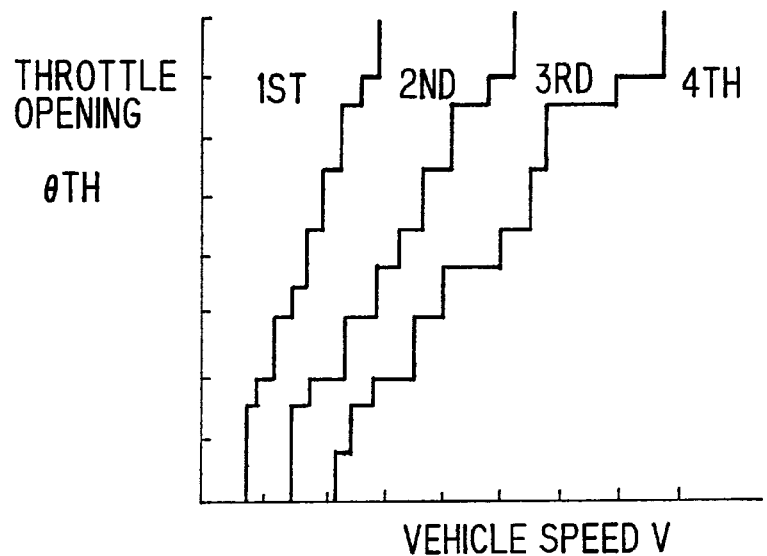
FIG. 5 is a graph showing the characteristics of one from among the maps for level-road running.
Figure 6:
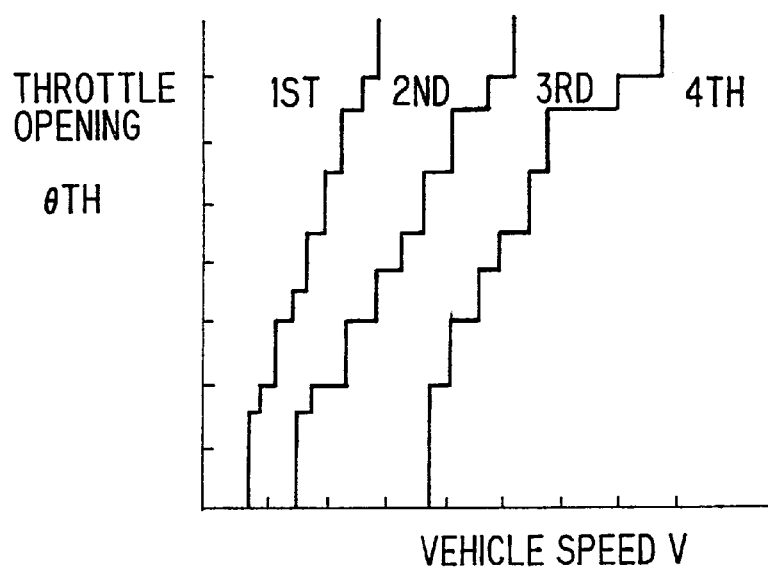
FIG. 6 is a view, similar to FIG. 5, but showing the characteristic of another from among the maps for moderate hill climbing.

The program proceeds to S46 in which possible largest and smallest maps MAPS 1, 2 are discriminated. In the control, five kinds of gearshift scheduling maps are prepared as mentioned earlier and are identified by numbers 0 to 4. FIG. 5 shows the characteristics of the map for level-road running and FIG. 6 shows those for moderate hill climbing. The procedure in this step is to compare the average value of the difference PNOAVE or PKUAVE with reference values PNO12, PNO21, . . . or PKU32, 23, . . . illustrated in FIGS. 7 and 8 and to determine a possible smallest (in umber) map MAPS 1 and a possible largest (in number) map MAPS 2.

The program proceeds to S48 in which one (named MAPS) of the possible least map MAPS 1 and the possible largest map MAPS 2 is selected, to S50 in which an output gear to be shifted (named SO) to is determined in accordance with the gearshift scheduling characteristic defined in the selected map MAPS using the detected vehicle speed and throttle opening as address data The program then proceeds to S52 in which it is determined whether the gear currently engaged is not equal to the determined gear to be shifted to, i.e., it is determined whether gearshift is to be conducted.

When the result is affirmative, the program proceeds to S54 in which gearshift is conducted by energizing or deenergizing the solenoid valves SL1 and SL2. The program proceeds to S56 in which a timer TMD1 (down counter) is set with a value YTMD1 and is started to measure time lapse when the gearshift is to downshift, while a timer TMD2 (down counter) is set with a value YIMD2 and is started to measure time lapse when the gearshift is to upshift. This will be explained later. On the other hand, when the result of S52 is negative, since gearshift is unnecessary, the program is immediately terminated.

Next, the gearshift control in the manual-shift mode will be explained with reference to a flow chart shown in FIG. 9. The program shown there is also executed once every 20 msec.

The program begins in S100 in which it is determined whether manual shift mode is selected from the bit of the flag F.SUREM in the same manner as was explained with reference to S10 in the flow chart of FIG. 3.

When the bit of the flag is found to be 0 in S100, i.e., when the manual-shift mode is not selected, the program proceeds to S102 in which a first timer TMFMD (down counter) is set with an initial value YTMFMD and is started to measure time lapse, to S104 in which a second timer TMFMU is set with an initial value YTMFMU and is started to measure time lapse.

The program then proceeds to S106 in which the bit of a flag FFMD is set to 1, to S108 in which the bit of a flag FFMU is set to 1 (explained later). The program then proceeds to S110 in which an output gear FMAP to be shifted to in the manual-shift mode FMAP is replaced with an initial value SMAP0 and a desired gear in the manualshift mode FMAPR is replaced with the initial value SMAP0.

On the other hand, when the bit of the flag is found to be 1 in S100, in other words, when it is determined that the manual-shift mode is selected, the program proceeds to S112 in which it is determined whether a value of a timer (down counter) TMFTNT is zero. The timer is started at the time of engine starting and measures time lapse therefrom. In this step, therefore, it is determined whether a predetermined period corresponding to the timer value has lapsed. More specifically, it is determined whether engine speed is stable such that gearshift is feasible.

When the result in S112 is negative, the program proceeds to S114 in which the same procedures as those in S110 are taken. When the result of S114 is affirmative, on the other hand, the program proceeds to S116 in which the output signals of the switches SW10, SW11 are read. In other words, it is determined whether the driver generates a manual-shift command, i.e, an upshifting command or a downshifting command.

Figure 10:
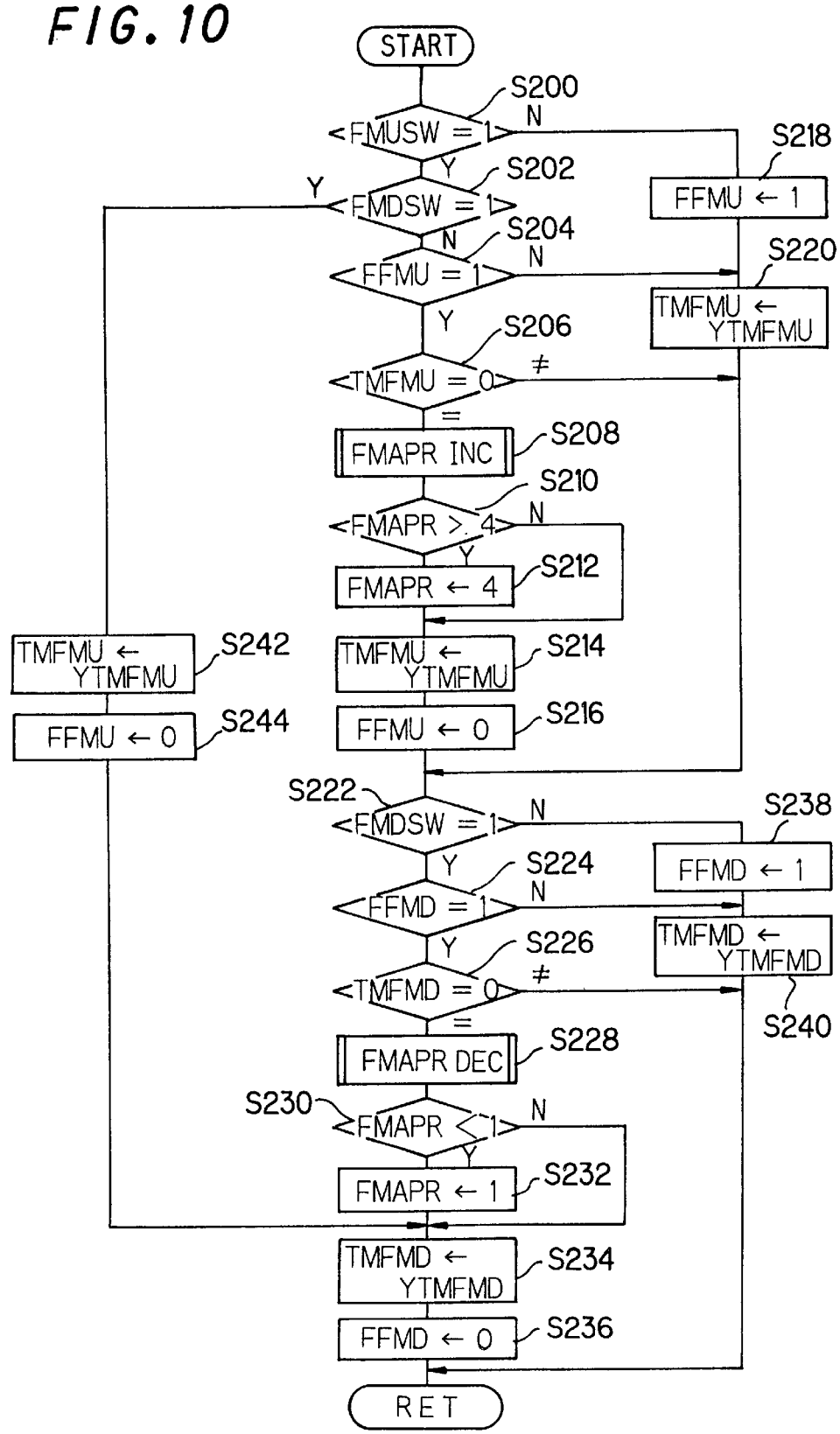
FIG. 10 is a flow chart showing the subroutine described in the flow chart of FIG. 9 for determining whether manual-shifting command is generated.

FIG. 10 is a flow chart showing the subroutine of procedures in the step.

The program begins in S200 in which it is determined whether the bit of a flag FMUSW is 1. The bit of the flag is set to 1 in a routine (not shown) when the switch SW10 becomes ON. When the result is affirmative, it is considered that the upshifting command has been generated so that the program proceeds to S202 in which the bit of a flag FMDSW is 1. The bit of the flag is also set to 1 in a routine (not shown) when the switch SW11 becomes ON.

Since the issuance of the upshifting command has been detected, the result of S202 is normally negative and the program proceeds to S204 in which it is determined whether the bit of the flag FFMU is 1. Since the bit of the flag was set to 1 in S108 and the result of S204 is normally affirmative, the program proceeds to S206 in which it is determined whether the value YTMFMU of the timer TMFMU has reached zero. The timer is started each time when not in the manual-shift mode. The system is configured such that the upshifting command is not accepted until the period (YTMFMU) has expired, enabling to prevent frequent gearshift due to chattering noise in the switch signal from occurring.

When it is determined in S206 that the timer value has reached zero, the program proceeds to S208 in which the desired gear to be shifted to in the manual-shift mode FMAPR is increased.

Figure 11:
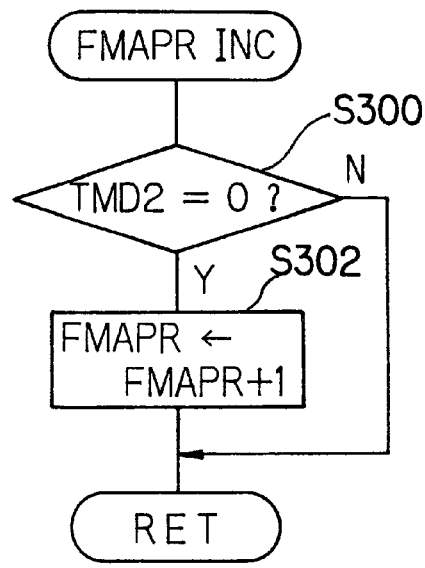

FIG. 11 is a flow chart showing the subroutine of the desired gear increase.

The program begins in S300 in which it is determined whether the value of the timer TMD2 has reached zero. As described earlier with reference to S56 in the flow chart of FIG. 3, the timer is started in the auto-shift mode when gearshift, more precisely upshifting, should be conducted. When the result in S300 is negative, the program is immediately terminated.

On the other hand, when the result in the step is affirmative, the program proceeds to S302 in which the desired gear to be shifted to FMAPR is incremented by one gear. Thus, the desired gear to be shifted to is increased in response to the upshifting command.

Having been configured in the foregoing manner, the system can prevent continuous gearshift not intended by the driver from happening if the value of the timer TMD2 is appropriately set. Moreover, when downshifting is continuously made in the manual-shift mode just after downshifting in the auto-shift mode, it sometimes causes the engine to rev excessively, degrading fuel economy. At the same time, the continuous downshifting may sometimes cause excessive engine braking effect, lowering drivability or driver's comfort. Since, the system is configured in the foregoing manner, however, it can avoid such disadvantages from occurring.

Returning to the explanation of FIG. 10, the program proceeds to S210 in which it is determined that the desired gear to be shifted to FMAPR is greater than 4th gear. When the result is affirmative, since no upshifting over 4th gear is possible, the program proceeds to S212 in which FMAPR is limited to 4th gear.

The program then proceeds to S214 in which the timer TMFMU is set with the initial value and is restarted, to S216 in which the bit of the flag FFMU is reset to 0. Resetting this bit of the flag means that the upshifting command is accepted.

When the result of S200 is negative, the program proceeds to S218 in which the bit of the flag FFMU is set to 1, to S220 in which the timer TMFMU is set with the value YTMFMU to start time measurement. The program skips the procedures up to S216.

When the result of S200 is affrmative indicating that a upshifting command is generated, but the result in S204 is negative, more specifically upshifting commands are consecutively confirmed within a period (longer than the chattering noise prevention period), the program similarly skips the procedures up to S216 in order to prevent continuous gearshift.

The program then proceeds to S222 and on for confirming the downshifting command.

In S222, it is determined whether the bit of the flag FMDSW is 1, saying this in other words, it is determined whether a downshifting command has been input. When the result is affirmative, the program proceeds to S224 in which it is determined whether the bit of the flag FFMD is 1. Since the bit of the flag is set to 1 such as in S106 in the flow chart of FIG. 9, the result is naturally affirmative and the program proceeds to S226 in which it is determined whether the value of the timer TMFMD has reached zero. This done for the same reason as mentioned in S206 in upshifting. When it is determined in S226 that the timer value has reached zero, the program proceeds to S228 in which the desired gear to be shifted to FMAPR is decreased.

Figure 12:
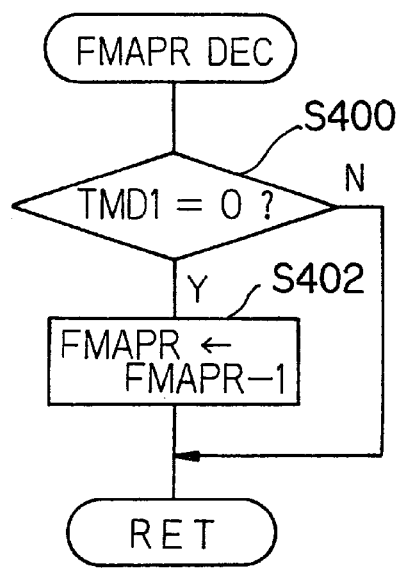

FIG. 12 is a flow chart showing the subroutine of the desired gear decrease.

The program begins in S400 in which it is determined whether the value of the timer TMD1 has reached zero. As described earlier with reference to S56 in the flow chart of FIG. 3, the timer is started in the auto-shift mode when gearshift, more precisely downshifting, should be conducted. When the result in S400 is negative, the program is immediately terminated.

On the other hand, when the result in the step is affirmative, the program proceeds to S402 in which the desired gear to be shifted to FMAPR is decremented by one gear. Thus, the desired gear to be shifted to is decreased in response to the downshifting command.

Similar to the configuration shown in FIG. 11, this configuration can prevent continuous gearshift not intended by the driver from happening by appropriately setting the value of the timer TMD1. Moreover, when upshifting is continuously made in the manual-shift mode just after upshifting in the auto-shift mode, it sometimes causes the engine speed to drop, degrading vehicle acceleration ability. Since, the system is configured in the foregoing manner, however, it can avoid such disadvantages from occurring.

Returning to the explanation of FIG. 10, the program proceeds to S230 in which it is determined that the desired gear to be shifted to FMAPR is less than 1st gear. When the result is affirmative, since no downshifting beyond 1st gear is possible, the program proceeds to S232 in which FMAPR is limited to 1st gear.

The program then proceeds to S234 in which the timer TMFMD is set with the initial value and is restarted, to S236 in which the bit of the flag FFMD is reset to 0. Resetting this bit of the flag means that the downshifting command is accepted.

When the result in S222 is negative, the program proceeds to S238 in which the bit of the flag FFMD is set to 1, then to S240 in which the timer TMFMD is set with the value YTMFMD to start time measurement.

When the result in S202 is affirmative indicating that a downshifting command is generated, since S200 found that the upshifting command was generated, the upshift command and the downshift command are generated consecutively. In such a case, the program proceeds to S242 in which the timer TMFMU is again set with the initial value to restart time measurement, to S244 in which the bit of the flag FFMU is reset to zero so as to accept the upshifting command.

Returning to the flow chart of FIG. 9, the program proceeds to S118 in which it is again confirmed whether the command in the manual-shift mode should immediately be executed.

As mentioned above, when the driver desires a certain gear in the manual-shift mode, maintaining the certain gear may sometimes result in an engine speed insufficient for vehicle acceleration or result in insufficient engine braking effect when the certain gear is too high relative to the vehicle speed, degrading the drivability or driver's comfort.

In order to solve the problem, it has been proposed to include the automatic downshifting function in the manual-shifting mode, in which the four gears are each assigned with predetermined threshold vehicle speeds so as to prevent the above drawbacks from happening. More precisely, if the vehicle speed drops below the predetermined threshold vehicle concerned, the gear is automatically shifted down. This is the operation referred to as the sub-auto-shift mode or auto-downshifting means.

Figure 13:
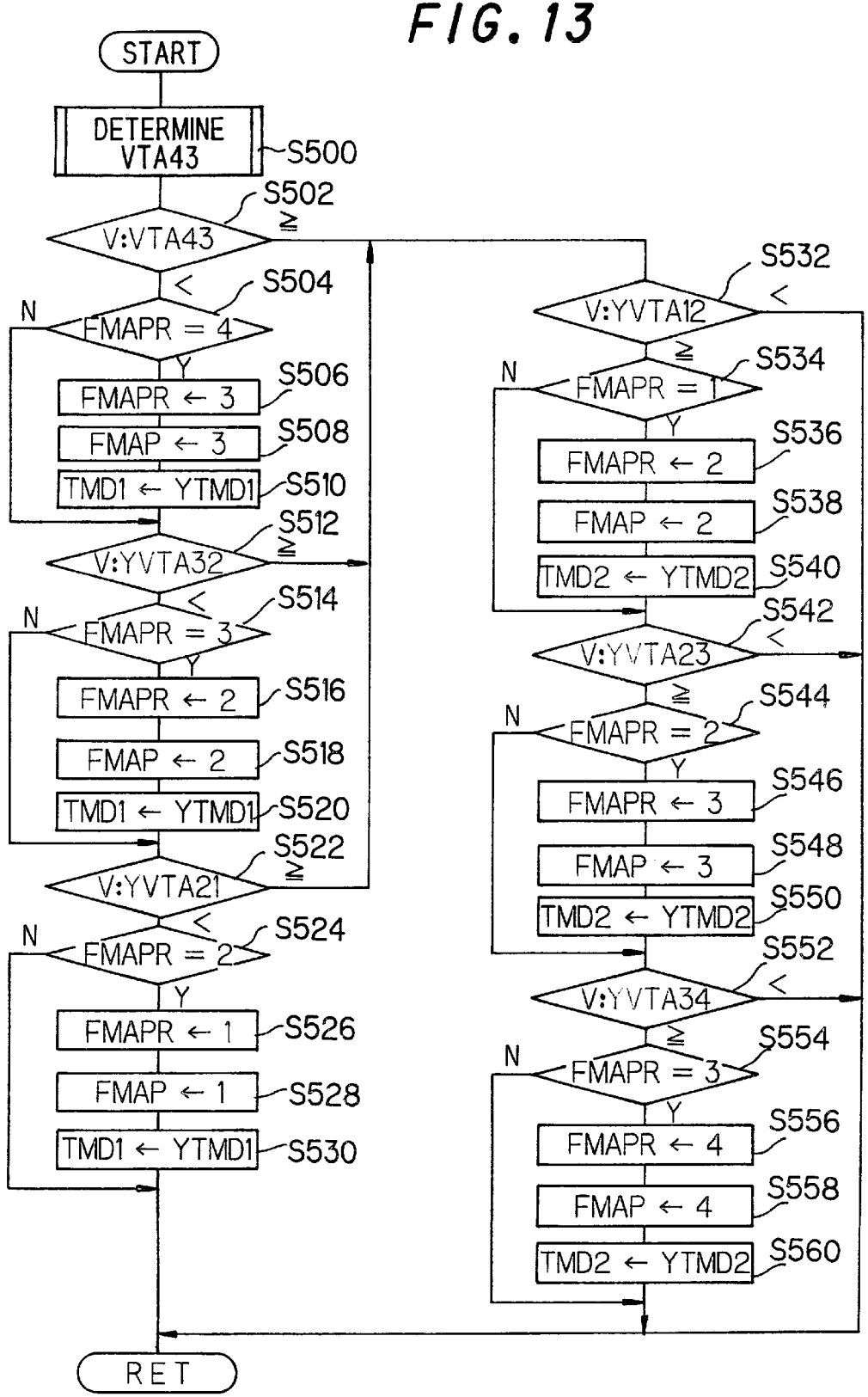
FIG. 13 is a flow chart showing the subroutine described in the flow chart of FIG. 9 for confirming whether the manual-shifting command should be immediately conducted.

FIG. 13 is a flow chart showing the subroutine for this.

The program begins in S500 in which the threshold vehicle speed (for downshifting from 4th to 3rd gear) VTA43 is determined.

Figure 14:
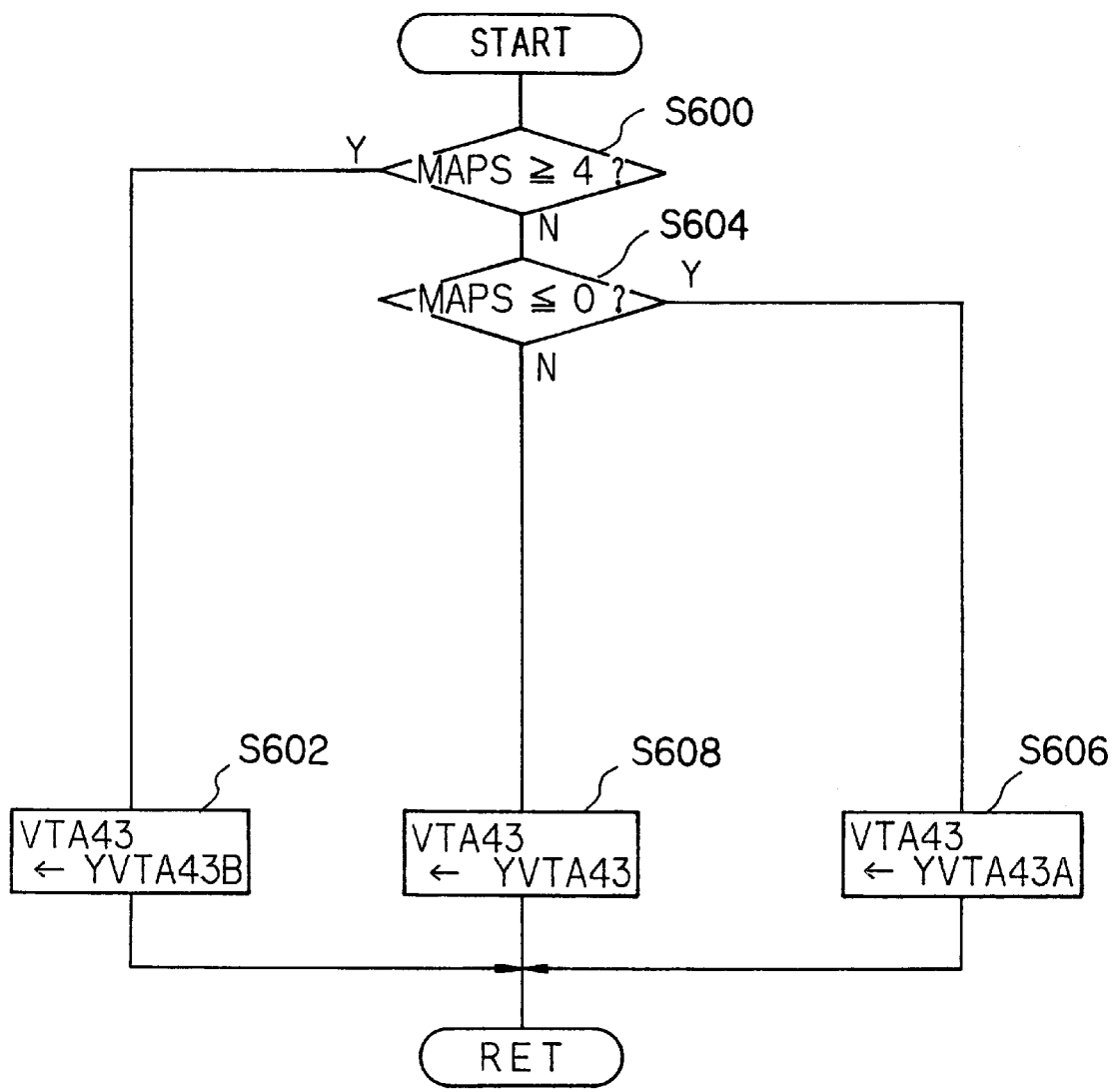
FIG. 14 is a flow chart showing the subroutine described in the flow chart of FIG. 13 for determining a threshold value VTA43 defining a threshold value for downshifting from 4th to 3rd gear.

FIG. 14 is a flow chart showing the subroutine for the VTA43 determination.

Figure 15:
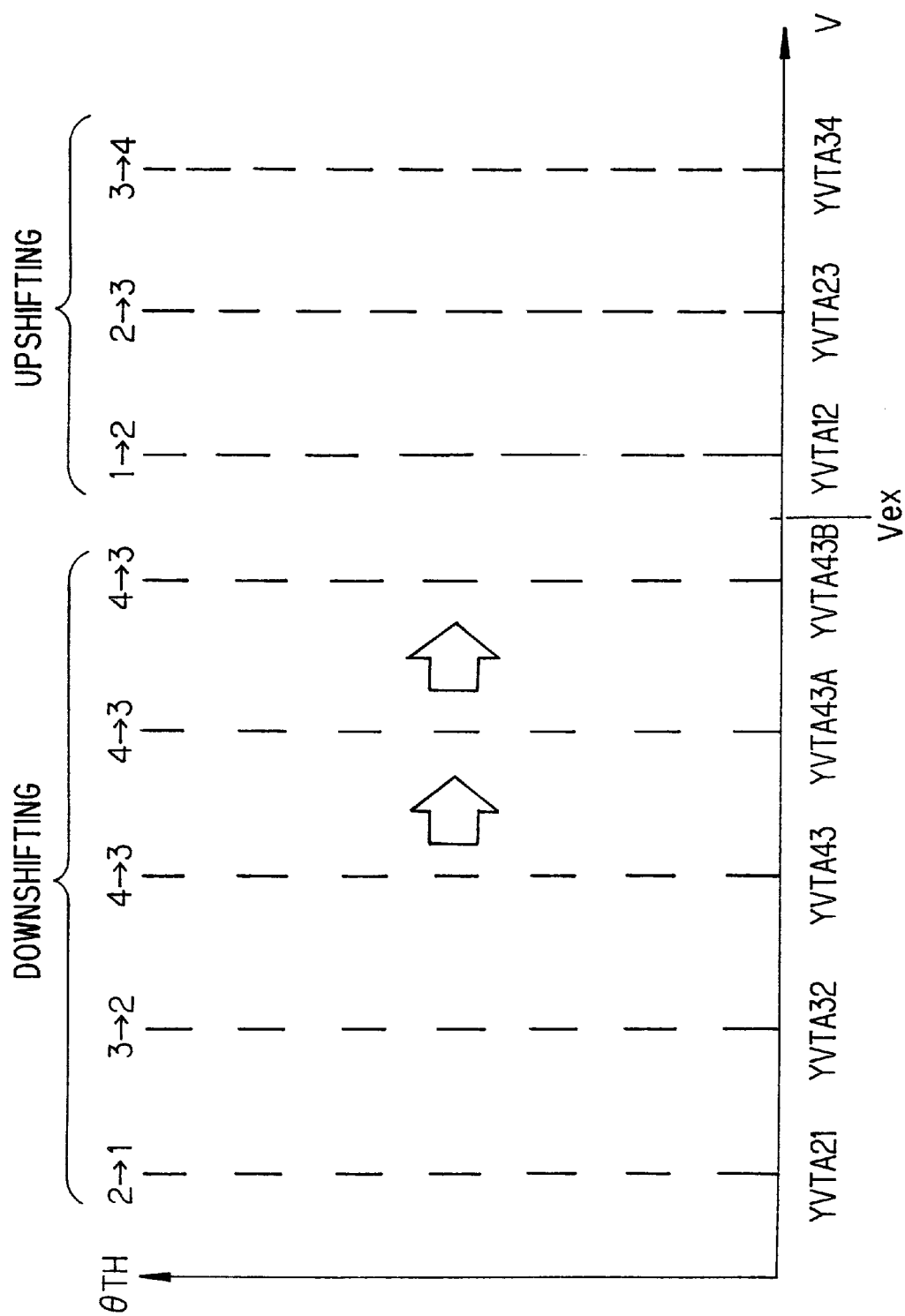
FIG. 15 is a graph explaining the characteristics of the manual-shift mode or manual-shifting means and threshold values used there including those for VTA43.

Before entering the explanation of the flow chart, the operation will be briefly referring to using FIG. 15. FIG. 15 illustrates the gearshift scheduling map of the manual-shift mode. The detected vehicle speed is compared with, for example, the illustrated values such as YVTA21 (a threshold value, e.g., 10 km/h, defining downshifting from 2nd to 1st gear), YVTA12 (a threshold value, e.g., 80 km/h, defining upshifting from 1st to 2nd gear). If the detected vehicle speed drops below any threshold value defining downshifting, the gear concerned is shifted down, while if the detected vehicle speed exceeds any threshold value defining upshifting, the gear concerned is shifted up.

The threshold value for downshifting from the 4th to 3rd gear comprises of three kinds of values YVTA43 (e.g., 30 km/h), YVTA43A (e.g., 50 km/h), YVTA43B Next, (e.g., 55 km/h). The aforesaid value VTA43 is a general name of the three. Naturally, YVTA43 is used. For example, YVTA23 is 140 km/h, YVTA34 is 180 kmn/h.

Assuming that the detected vehicle speed is Vex as illustrated in FIG. 15, accordingly, downshifting to 3rd gear will not occur naturally until the vehicle speed has drooped below YVTA43. This is disadvantageous, as mentioned earlier, due to the aforesaid drivability or driver's comfort being degraded, due to the increase of the running resistance during hill climbing, until the vehicle speed has dropped below the threshold value. A further degradation will also happen during hill descending due to the increase in the acceleration feeling. More specifically, depending on the vehicle running condition such as hill climbing, it is often difficult, without downshifting, to attain sufficient acceleration or to keep the vehicle speed. Similarly, hill descending without gearshift may, depending on the situation, decrease engine braking effect and degrade drivability or driver's comfort. Taking this into account, the system is configured such that the threshold vehicle speed is corrected in S500 in the flow chart of FIG. 13 in response to the running condition, more precisely hill climbing or descending estimation.

Explaining the flow chart of FIG. 14, the program begins in S600 in which it is determined whether the number of the selected gearshift scheduling map MAPS is equal to or greater than 4, i.e., it is determined whether the selected map is that for steep hill descent. When the result is affirmative, the program proceeds to S602 in which VTA43 is determined to be YVTA43B.

On the other hand, when the result in S600 is negative, the program proceeds to S604 in which it is determined whether the number of the map selected is equal to or less than 0, i.e., it is determined whether the selected map MAPS is that for steep hill climbing. When the result is affirmative, the program proceeds to S606 in which VTA43 is determined to be YVTA43A. When the result of S604 is negative, since it is estimated that the vehicle is neither in hill climbing nor in hill descending, the program proceeds to S608 in which VTA43 is determined to be YVTA43. YVTA43 is a value for level-road running.

Having been configured in the foregoing manner, downshifting to 3rd will occur if the detected vehicle speed Vex merely drops below YVTA43B (illustrated in FIG. 15) when the vehicle is estimated to be steep hill descending, or if Vex drops below YVTA43A when the vehicle is estimated to be steep hill climbing. As a result, downshifting will be made at an earlier stage when the vehicle is estimated to be in (steep) hill climbing or descending. With the arrangement, it becomes possible to downshift at an earlier stage when the vehicle is estimated to be in (steep) hill climbing or descending, enabling it to accelerate sufficiently or to maintain the vehicle speed, as a result of a sufficient engine braking effect. The drivability or drive's comfort can thus been prevented from being degraded.

Returning to the explanation of the flow chart of FIG. 13, the program proceeds to S502 in which the detected vehicle speed V is compared with the aforesaid VT43. When the detected vehicle speed V is equal to or greater than VT43, since no downshifting is allowed, the program proceeds to S532 and on for upshifting checking.

On the other hand, when it is determined in S502 that the detected vehicle speed V is less than VT43, the program proceeds to S504 in which the desired gear (to be shifted to) FMAPR is 4th. When the result is affirmative, since the downshifting from 4th to 3rd is possible, the program proceeds to S506 in which the desired gear FMAPR is changed to 3rd, to S508 in which the output gear FMAP is also determined as 3rd.

The program then proceeds to S510 in which the timer TMD1 is set with the YTMD1 to start time measurement. The timer TMD1 (or TMD2 as will be referred to later) is started not only in the downshifting in the auto-shift mode, but also in the manual-shift mode so as to inhibit the acceptance of the driver's command for a predetermined period corresponding to YTMD1 (or YTMD2). Since the purpose of these procedures is to confirm whether the driver's command should be conducted, so as to prevent a gearshift not desired by the driver from occurring, this will also be applied in the manual-shift mode.

On the other hand, when it is determined in S504 that the desired gear is not 4th, the program skips the procedures up to S510. In the manual-shift mode disclosed, downshifting is only made one by one and no jumping gearshift such as from 4th to 2nd is made.

The program proceeds to S512 in which the detected vehicle speed V is compared with YVTA32. When it is determined in S512 that the detected vehicle speed V is equal to or greater than YVTA32, since no downshifting from 3rd to second is allowed, the program proceeds to S532. On the other hand, when it is determined in S512 that the detected vehicle speed V is less than YVTA32, the program proceeds to S514 in which FMAPR is 3rd. When the result in S514 is affirmative, the program proceeds to S516 in which FMAPR is changed to 2nd, to S518 in which FMAP is determined to be 2nd, to S520 in which the timer TMD1 is started. On the other hand, when the result in S514 is negative, the program skips the procedures up to S520.

The program proceeds to S522 in which the detected vehicle speed V is similarly compared with YVTA21. When it is determined in this step that the detected vehicle speed is less than YVTA21, the program proceeds to S524 in which it is determined whether FMAPR is 2nd. When the result is affirmative, the program proceeds to S526 in which FMAPR is changed to 1st, to S528 in which FMAP is determined to be the same gear, to S530 in which the timer is started. On the other hand, when the result in S524 is negative, the program skips the procedures up to S530.

When it is determined in one of S502, S512 and S522 that no downshifting should be made, the program proceeds to the procedures, shown in the right of FIG. 13, to determine whether upshifting should be performed.

More specifically, the program proceeds to S532 in which the detected vehicle speed V is compared with YVTA12 and when it is determined in this step that the detected vehicle speed V is less than YVTA12, since no upshifting should be done, the program is immediately terminated. On the other hand, when it is determined in S532 that the detected vehicle speed V is not less than YVTA12, the program proceeds to S534 in which it is determined whether FMAPR is 1st. When the result is affirmative, the program proceeds to S536 in which the desired gear is changed to 2nd, then to S538 in which the output gear is determined to be 2nd, to S540 in which the timer TMD2 is set with the value and is started for the same reason mentioned with reference to S510. When the result in S534 is negative, the program skips the procedures from S536 to S540.

The program proceeds to S542 in which the detected vehicle speed V is compared with YVTA23, and when the detected vehicle speed is less than YVTA23, the program is immediately terminated. When the detected vehicle speed V is not less than VTA23, the program proceeds to S544 in which FMAPR is 2nd. When the result is affirmative, the program proceeds to S546 in which FMAPR is changed as 3rd, to S548 in which FMAP is determined to be 3rd, to S550 in which the timer TMD2 is started. On the other hand, when the result in S544 is negative, the program skips the procedures up to S550.

The program proceeds to S552 in which the detected vehicle speed is compared with YVTA34, and when the detected vehicle speed is less than YVTA34, the program is immediately terminated. When the detected vehicle speed V is not less than YVTA34, the program proceeds to S554 in which FMAPR is 3rd. When the result is affirmative, the program proceeds to S556 in which FMAPR is changed as 4th, to S558 in which FMAP is determined to be 4th, to S560 in which the timer TMD2 is started. On the other hand, when the result in S554 is negative, the program skips the procedures up to S550.

Returning to the explanation of FIG. 9, the program proceeds to S120 in which the output gear FMAP is determined.

Figure 16:
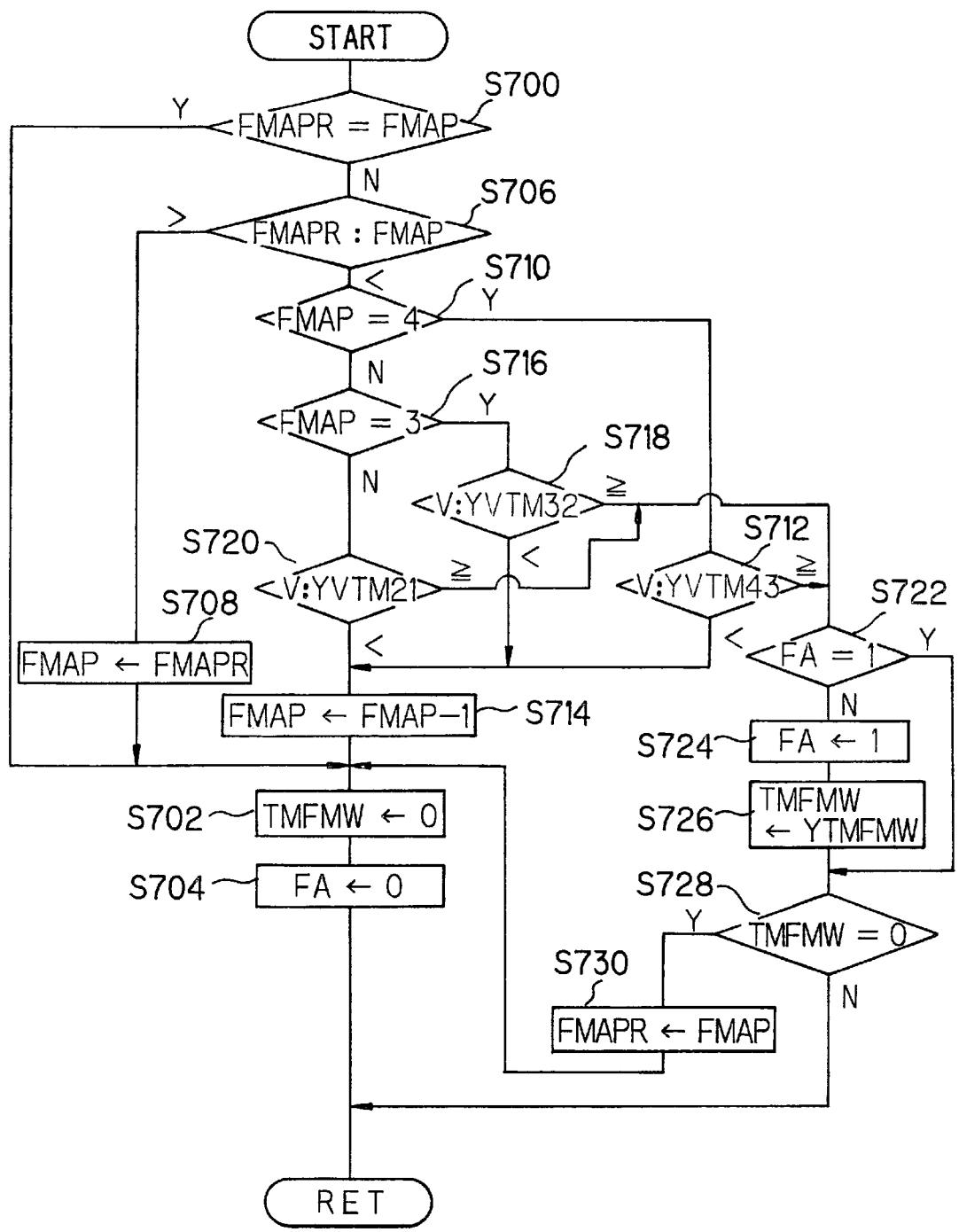
FIG. 16 is a flow chart showing the subroutine described in the flow chart of FIG. 9 for determining an output gear FMAP.

FIG. 16 is a flow chart showing the subroutine for the output gear determnination.

The program begins in S700 in which it is determined whether the desired gear to be shifted to FMAPR is equal to the output gear FMAP. When, for example, either an upshifting command or a downshifting command has not been accepted in the manual-shift mode, or when they are determined to be the same value in S506, S508, etc., FMAPR and FMAP become equal to each other.

When the result of S700 is affirmative, the program proceeds to S702 in which a value of a timer (down counter) TMFMW (explained later) is reset to zero, to S704 in which the bit of a flag FA is reset to 0, and is terminated. Resetting the bit of the flag FA to 0 means that the value of the timer TMFMW is reset, while setting the bit of the flag FA to 1 means that the timer is set with the value to start time measurement.

When the result of S700 is negative, the program proceeds to S706 in which FMAPR and FMAP are compared with each other. When it is determined in S706 that FMAPR is greater than FMAP, since this means upshifting, the program proceeds to S708 in which FMAPR is determined to be FMAP. The program proceeds, via S702, to S704 in which the bit of the flag FA is reset to 0.

Figure 17:
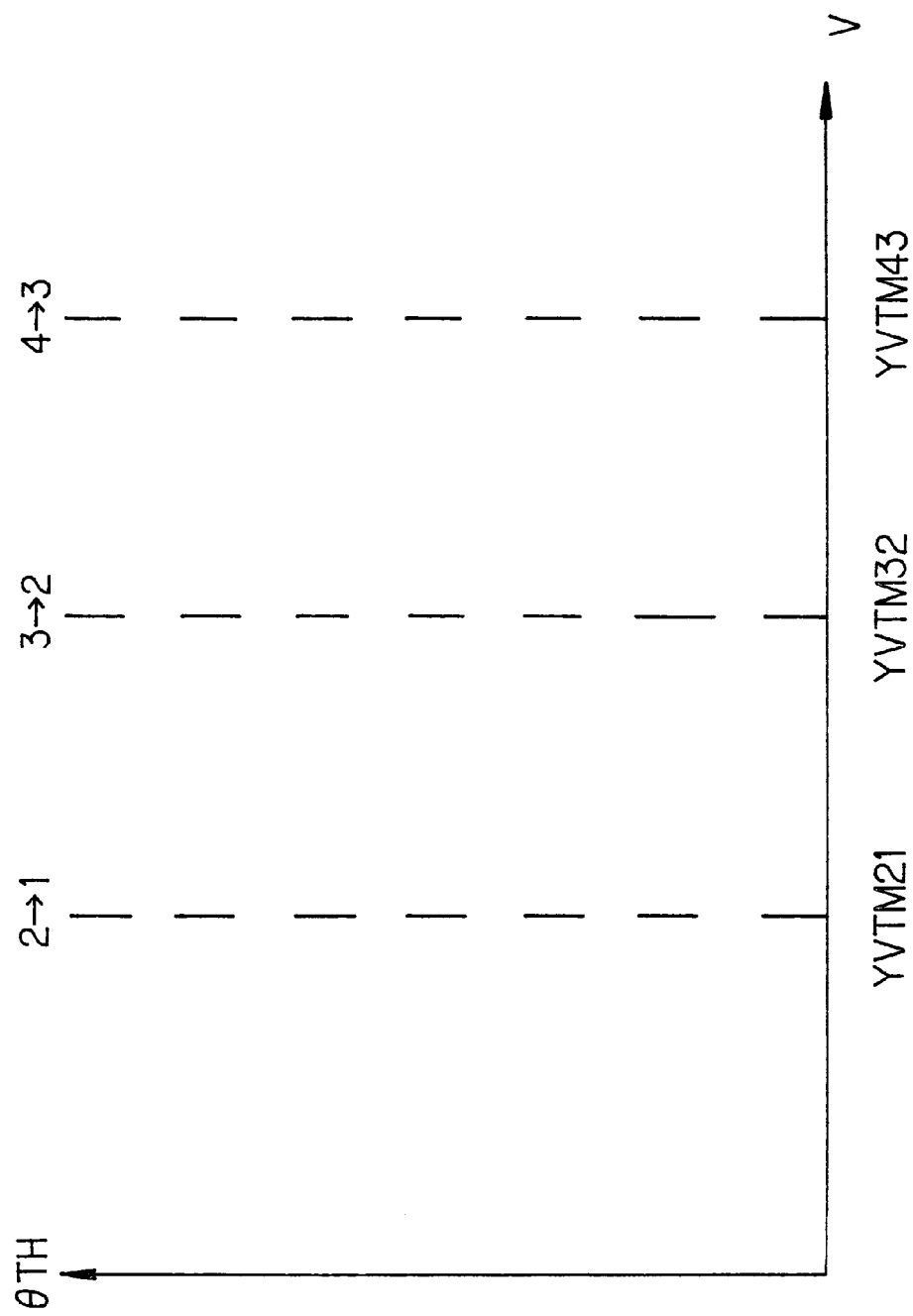
FIG. 17 is a graph explaining the characteristics of the sub-auto-shift mode or auto-downshifting means and threshold values used there.

On the other hand, when it is determined in S706 that FMAP is greater than FMAPR, since this means downshifting, the program proceeds to S710 in which it is determined whether FMAP is 4th gear. When the result is affirmative, the program proceeds to S712 in which the detected vehicle speed V is compared with a value YVTM43. The value YVTM43 is a second threshold value (e.g., 160 km/h) which defines a permissible vehicle speed for downshifting from 4th to 3rd and as illustrated in FIG. 17, YMTM32, e.g., 100 km./h and YVTM21, e.g., 50 km/h are similarly determined which define permissible speeds for downshifting from 3rd to 2nd and from 2nd to 1st. The values are thus different from those shown in FIG. 15. In S712 and onward, it is determined whether downshifting is permissible by comparison.

When it is determined in S712 that the detected vehicle speed V is less than YVTM43, since downshifting is permissible, the program proceeds to S714 in which FMAP is decreased by one gear. The program proceeds to S702 in which the timer value is reset, to S704 in which the bit of the flag is reset to 0.

When it is determined in S710 that FMAP is not 4th, the program proceeds to S716 in which it is determined whether FMAP is 3rd. This will be the same when FMAP was determined to be 4th in S710 and was decreased by one gear in S714 in the proceeding program loop (control cycle). When the result of S716 is affirmative, the program proceeds to S718 in which the detected vehicle speed V is compared with YVTA34. When it is determined in S718 that the detected vehicle speed is less than YVTM32, the program proceeds to S714 in which FMAP is decreased by one gear, and to S702, S704.

When the result is negative in S716 (or when the program proceeded to S716, S718, S714 in which FMAP is decreased in the proceeding program loop), the program proceeds to S720 in which the detected vehicle speed V is compared with YVTM21. When it is determined in S720 that the detected vehicle speed is less than YVTM21, the program proceeds to S714 in which FMAP is decreased by one gear, and to S702, S704.

On the other hand, when any of S712, S718, S720 finds that the detected vehicle is not less than the corresponding second threshold value, since no downshifting is permissible, the program proceeds to S722 in which it is determined whether the bit of the flag FA is set to 1. Since the flag bit is reset to 0 in S704, the result is naturally negative and the program proceeds to S724 in which the flag bit is set to 1, to S726 in which the timer TMFMW is set with a prescribed value YTMFMW and is started for time measurement. The program proceeds to S728 in which it is determined whether the timer value has reached zero.

Since the timer was just started in the preceding step, the result is naturally negative and the program is terminated. In the next program loop, when the program proceeds to up to S722 in which the result is naturally affirmative, the program again proceeds to S728. Until the result becomes affirmative, the program is terminated.

When the result becomes affirmative in a later program loop, the program proceeds to S730 in which FMAP is rewritten as FMAPR, and the program proceeds to S702, S704. The reason why FMAPR is made equal to FMAP, is to cancel downshifting previously intended.

Again returning to FIG. 9, the program proceeds to S121 in which FMAP thus determined is determined to be the output SO. The program proceeds to S122 in which it is determined whether the output SO and the current gear SH are different from each other. When the result is affirmative, the gearshift is conducted in the manner mentioned in the auto-shift mode with reference to S54 in the flow chart of FIG. 3. On the other hand, when the result in S122 is negative, the program is immediately terminated.

Since the embodiment is configured as above, it becomes possible to gearshift in the manual-shift mode in response to the vehicle running condition. Specifically, when the vehicle is estimated to be climbing or descending a steep hill in the manual-shift mode, the gear is shifted down at an earlier stage than that during a level-road running, preventing the drivability or driver's comfort being degraded. More specifically, in the automatic vehicle transmission having the auto-shift mode and the manual-shift mode with the sub-auto shift mode (automatic downshifting function), the gear is shifted down at an earlier stage when the vehicle is estimated to be in steep hill climbing or descent to prevent degradation of the drivability or the driver's comfort due to steep hill climbing or descending.

As a result, when the vehicle is estimated to be in a steep hill climbing mode, and when it is difficult to provide sufficient acceleration or to maintain the vehicle speed, the gear is shifted down, preventing the problem from happening. Similarly when the vehicle is estimated to be descending a steep hill where the acceleration felt by the driver may become great, the gear is shifted down in order that no problem occurs. The problem of an inadequate engine braking effect is thus prevented by a downshift of the gear. Since downshifting occurs, however, such a problem will not happen.

Figure 18:
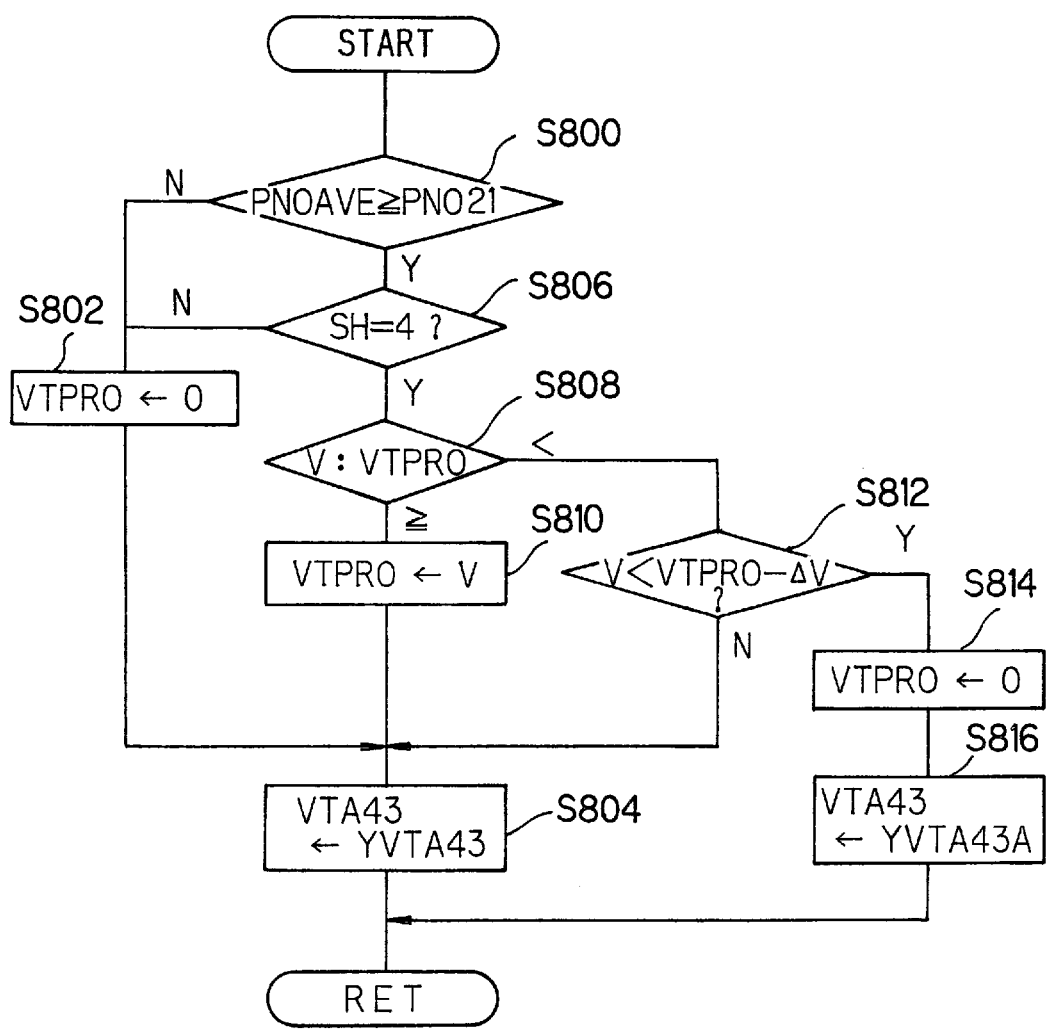
FIG. 18 is a view similar to FIG. 14, but showing the operation of the system according to a second embodiment of the invention.

FIG. 18 is a view, similar to FIG. 14, but showing a second embodiment of the system according to the invention.

In the second embodiment, the program begins in S800 in which the average value of the difference in hill-climbing PNOAVE is compared with a prescribed value PNO21 (the threshold value for the steep-hill climbing (MAPS 4) illustrated in FIGS. 7 and 8). In other words it is determined in S800 whether the running condition is such that the steep-hill climbing map (MAPS 0) is selected.

When the result in S800 is negative, the program proceeds to S802 in which a predetermined vehicle speed VTPRO is made zero, to S804 in which VTA43 is determined to be YVTA43 (threshold value for level-road running). On the other hand, when the result in S800 is affirmative, the program proceeds to S806 in which it is determined whether current gear SH is 4th. When the result is affirmative, the program proceeds to S808 in which the detected vehicle speed V is compared with the value VTPRO. Since VTPRO was set to zero, it is naturally determined in S808 that the detected vehicle speed is not less than VTPRO, and the program proceeds to S810 in which VTPRO is replaced with the detected (maximum) vehicle speed V, and to S804.

In the next or later program loop, the program proceeds to S808 and unless it is determined in the step that V is less than VTPRO, the program proceeds to S810, S804. This is performed, since if the vehicle speed does not drop during the hill climbing, it is considered unnecessary to change the value VTA43.

On the other hand, when it is determined in S808 that the detected vehicle speed V is less than VTPRO, i.e., the vehicle speed drops, the program proceeds to S812 in which VTPRO is decreased by a small prescribed value $\Delta V$ (e.g., 5 km/h) and it is determined whether the detected vehicle speed V is less than the difference. When the result is negative, since it is considered that the motive power is still sufficient, the program proceeds to S804. When the result is affirmative in S812, in the opposite case, since this indicates that the current gear can not generate the vehicle speed, the program proceeds to S814 in which VTPRO is reset to zero since the value is no longer necessary, to S816 in which VTA43 is changed or corrected by YVTA43A.

Having been configured in the foregoing manner, the embodiment has the same advantages as those of the first embodiment. Moreover, since it is determined in the second embodiment whether the vehicle speed can be maintained and in response to the determination, the value VTA43 is changed or corrected. Since the actual running condition, i.e., the vehicle speed is taken into consideration, it becomes possible to replace the value VTA43 more appropriately to solve the degradation of the drivability or driver's comfort more appropriately.

Although the five kinds of gearshift scheduling maps are prepared such that one of them is selected in response to the vehicle running condition in the auto-shift mode, the invention should not be limited to this number of configurations. Instead, it is alternatively possible to decrease or increase the number of the maps, or to use a conventional single gearshift scheduling map to control gearshift in the auto-shift mode.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. An improved system for controlling automatic transmission of a vehicle having an engine mounted on the vehicle and a plurality of gears, including:

vehicle speed detecting means for detecting a vehicle speed at which the vehicle is travelling;

engine load detecting means for detecting a load of the engine;

auto-shifting means for determining one of the gears to be shifted to in accordance with predetermined gearshift scheduling characteristics in response to the detected vehicle speed and the engine load;

manual-shifting command generating means for generating a manual-shifting command in response to operation of a device manually operated by a vehicle driver;

manual-shifting means for determining one of the gears to be shifted to in response to the manual-shift command;

discriminating means for discriminating which of the auto-shifting means and the manual-shifting means is in operation;

auto-downshifting means for determining one of the gears to be downshifted to if the detected vehicle speed is less than a threshold value when the manual-shifting means is in operation; and gearshift means for conducting gearshift such that the one of the gears is shifted to;

wherein the improvement comprises:

hill-climbing estimating means for estimating whether the vehicle is climbing a hill; and threshold value increasing means for increasing the threshold value when the hill climbing means estimates that the vehicle is hill climbing.

2. A system according to claim 1, wherein said hill-climbing estimating means including:

index determining means for determining an index indicative of a running resistance of the vehicle based at least on the detected vehicle speed and the engine load;

comparing means for comparing the index with prescribed values; and hill-climbing determining means for determining that the vehicle is hill climbing when the index exceeds one of the prescribed values.

3. A system according to claim 1, further including:

means for preventing the downshifting from happening consecutively.

4. An improved system for controlling automatic transmission of a vehicle having an engine mounted on the vehicle and a plurality of gears, including:

vehicle speed detecting means for detecting a vehicle speed at which the vehicle is travelling;

engine load detecting means for detecting a load of the engine;

auto-shifting means for determining one of the gears to be shifted to in accordance with predetermined gearshift scheduling characteristics in response to the detected vehicle speed and the engine load;

manual-shifting command generating means for generating a manual-shifting command in response to operation of a device manually operated by a vehicle driver, manual-shifting means for determining one of the gears to be shifted to in response to the manual-shift command;

discriminating means for discriminating which of the auto-shifting means and the manual-shifting means is in operation;

auto-downshifting means for determining one of the gears to be downshifted to if the detected vehicle speed is less than a threshold value when the manual-shifting means is in operation; and gearshift means for conducting gearshift such that the one of the gears is shifted to;

wherein the improvement comprises:

hill-descending estimating means for estimating whether the vehicle is descending a hill; and threshold value increasing means for increasing the threshold value when the hill descending means estimates that the vehicle is hill descending.

5. A system according to claim 4, further including:

hill-climbing estimating means for estimating whether the vehicle is climbing a hill; and second threshold value increasing means for increasing the threshold value when the hill climbing means estimates that the vehicle is hill climbing.

6. A system according to claim 4, wherein said hill-climbing estimating means including:

index determining means for determining an index indicative of a running resistance of the vehicle based at least on the detected vehicle speed and the engine load;

comparing means for comparing the index with prescribed values;

hill-climbing determining means for determining that the vehicle is hill climbing when the index exceeds one of the prescribed values.

7. A system according to claim 4, further including:

means for preventing the downshifting from happening consecutively.

8. An improved system for controlling automatic transmission of a vehicle having an engine mounted on the vehicle and a plurality of gears, including:

vehicle speed detecting means for detecting a vehicle speed at which the vehicle is travelling;

engine load detecting means for detecting a load of the engine;

auto-shifting means for determining one of the gears to be shifted to in accordance with predetermined gearshift scheduling characteristics in response to the detected vehicle speed and the engine load;

manual-shifting command generating means for generating a manual-shifting command in response to operation of a device manually operated by a vehicle driver;

manual-shifting means for determining one of the gears to be shifted to in response to the manual-shift command;

discriminating means for discriminating which of the auto-shifting means and the manual-shifting means is in operation;

auto-downshifting means for determining one of the gears to be shifted to if the detected vehicle speed is less than a threshold value when the manual-shifting means is in operation; and gearshift means for conducting gearshift such that the one of the gears is shifted to;

wherein the improvement comprises:

hill-climbing estimating means for estimating whether the vehicle is climbing a hill;

speed-drop detecting means for detecting whether the vehicle speed drops; and threshold value increasing means for increasing the threshold value if the speed-drop detecting means detects that the vehicle speed drops when the hill climbing means estimates that the vehicle is hill climbing.

9. A system according to claim 8, wherein said speed-drop detecting means including:

maximum vehicle speed storing means for storing a maximum vehicle speed when said hill-climbing estimating means estimates that the vehicle is hill climbing;

vehicle speed comparing means for comparing the detected vehicle speed with a difference obtained by subtracting a prescribed value from the maximum vehicle speed; and speed-drop determining means for determining that the vehicle speed drops when the detected vehicle speed is less than the difference.

10. A system according to claim 8, wherein said hill-climbing estimating means including:

index determining means for determining an index indicative of a running resistance of the vehicle based at least on the detected vehicle speed and the engine load;

comparing means for comparing the index with prescribed values;

hill-climbing determining means for determining that the vehicle is hill climbing when the index exceeds one of the prescribed values.

11. A system according to claim 8, further including:

means for preventing the downshifting from happening consecutively.

12. An improved method for controlling automatic transmission of a vehicle having an engine mounted on the vehicle and a plurality of gears, including:

(a) detecting a vehicle speed at which the vehicle is travelling;

(b) detecting a load of the engine;

(c) determining one of the gears to be shifted to in accordance with predetermined gearshift scheduling characteristics in response to the detected vehicle speed and the engine load;

(d) generating a manual-shifting command in response to operation of a device manually operated by a vehicle driver;

(e) determining one of the gears to be shifted to in response to the manual-shift command;

(f) discriminating which of the steps (c) and (e) is in operation;

(g) determining one of the gears to be downshifted to if the detected vehicle speed is less than a threshold value when the step (e) is in operation; and (h) conducting gearshift such that the one of the gears is shifted to;

wherein the improvement comprises steps of:
(i) estimating whether the vehicle is climbing a hill; and
(j) increasing the threshold value when the step (i) estimates that the vehicle is hill climbing.

13. A method according to claim 12, wherein said step (i) including the steps of:

(k) determining an index indicative of a running resistance of the vehicle based at least on the detected vehicle speed and the engine load;

(l) comparing the index with prescribed values; and (m) determining that the vehicle is hill climbing when the index exceeds one of the prescribed values.

14. A method according to claim 12, further including the step of:

(n) preventing the downshifting from happening consecutively.

15. An improved method for controlling automatic transmission of a vehicle having an engine mounted on the vehicle and a plurality of gears, including the steps of:

(a) detecting a vehicle speed at which the vehicle is travelling;

(b) detecting a load of the engine;

(c) determining one of the gears to be shifted to in accordance with predetermined gearshift scheduling characteristics in response to the detected vehicle speed and the engine load;

(d) generating a manual-shifting command in response to operation of a device manually operated by a vehicle driver;

(e) determining one of the gears to be shifted to in response to the manual-shift command;

(f) discriminating which of the steps (c) and (e) is in operation;

(g) determining one of the gears to be downshifted to if the detected vehicle speed is less than a threshold value when the step (e) is in operation; and (h) conducting gearshift such that the one of the gears is shifted to;

wherein the improvement comprises the steps of:
(i) estimating whether the vehicle is descending a hill; and
(j) increasing the threshold value when the step (i) estimates that the vehicle is hill descending.

16. A method according to claim 15, further including the steps of:

(k) estimating whether the vehicle is climbing a hill; and (l) increasing the threshold value when the step (i) estimates that the vehicle is hill climbing.

17. A method according to claim 15, wherein said (i) including the steps of:

(m) determining an index indicative of a running resistance of the vehicle based at least on the detected vehicle speed and the engine load;

(n) comparing the index with prescribed values;

(o) determining that the vehicle is hill climbing when the index exceeds one of the prescribed values.

18. A method according to claim 15, further including the step of:

(p) preventing the downshifting from happening consecutively.

19. An improved method for controlling automatic transmission of a vehicle having an engine mounted on the vehicle and a plurality of gears, including the steps of:

(a) detecting a vehicle speed at which the vehicle is travelling;

(b) detecting a load of the engine;

(c) determining one of the gears to be shifted to in accordance with a predetermined gearshift scheduling characteristics in response to the detected vehicle speed and the engine load;

(d) generating a manual-shifting command in response to operation of a device manually operated by a vehicle driver;

(e) determining one of the gears to be shifted to in response to the manual-shift command;

(f) discriminating which of the steps (c) and (e) is in operation;

(g) determining one of the gears to be shifted to if the detected vehicle speed is less than a threshold value when the step (e) is in operation; and (h) conducting gearshift such that the one of the gears is shifted to;

wherein the improvement comprises the steps of:
(i) estimating whether the vehicle is climbing a hill;
(j) detecting whether the vehicle speed drops; and
(k) increasing the threshold value if the step (j) detects that the vehicle speed drops when the step (i) estimates that the vehicle is hill climbing.

20. A method according to claim 19, wherein said step (j) including the steps of:

(l) storing a maximum vehicle speed when step (i) estimates that the vehicle is hill claiming;

(m) comparing the detected vehicle speed with a difference obtained by subtracting a prescribed value from the maximum vehicle speed; and (n) determining that the vehicle speed drops when the detected vehicle speed is less than the difference.

21. A method according to claim 19, wherein said step (i) including the steps of:

(p) determining an index indicative of a running resistance of the vehicle based at least on the detected vehicle speed and the engine load;

(q) comparing the index with prescribed values;

(r) determining that the vehicle is hill climbing when the index exceeds one of the prescribed values.

22. A method according to claim 19, further including the step of:

(s) preventing the downshifting from happening consecutively.

* * * * *